(12) United States Patent
Waldrop, III et al.

(10) Patent No.: US 10,464,268 B2
(45) Date of Patent: Nov. 5, 2019

(54) COMPOSITE FEEDSTOCK STRIPS FOR ADDITIVE MANUFACTURING AND METHODS OF FORMING THEREOF

(71) Applicant: The Boeing Company, Chicago, IL (US)

(72) Inventors: John C. Waldrop, III, Saint Peters, MO (US); Matthew S. Thompson, O'Fallon, MO (US); Michael W. Hayes, Belleville, IL (US); Stephen R. Heinz, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 15/051,285

(22) Filed: Feb. 23, 2016

(65) Prior Publication Data

US 2017/0057181 A1     Mar. 2, 2017

Related U.S. Application Data

(63) Continuation-in-part of application No. 14/835,323, filed on Aug. 25, 2015.

(51) Int. Cl.
| | |
|---|---|
| *B29C 70/30* | (2006.01) |
| *B29C 48/08* | (2019.01) |
| *B29C 48/154* | (2019.01) |
| *B29B 11/02* | (2006.01) |
| *B29C 70/02* | (2006.01) |
| *B29C 70/08* | (2006.01) |
| *B29C 70/38* | (2006.01) |
| *B29C 70/20* | (2006.01) |

(Continued)

(52) U.S. Cl.
CPC .............. *B29C 70/30* (2013.01); *B29B 11/02* (2013.01); *B29C 48/08* (2019.02); *B29C 48/154* (2019.02);

(Continued)

(58) Field of Classification Search
CPC ..... B29C 70/30; B29C 64/141; B29C 64/106; B29C 47/0021; B29C 47/025;

(Continued)

(56) References Cited

U.S. PATENT DOCUMENTS 8,372,231 B1 *   2/2013   Tsotsis .................. B29C 70/386
                                                              156/178
8,425,708 B2      4/2013   Rubin et al.

(Continued)

OTHER PUBLICATIONS

"U.S. Appl. No. 14/835,323, Restriction Requirement dated Jan. 30, 2018", 6 pages.

(Continued)

*Primary Examiner* — Kelly M Gambetta
(74) *Attorney, Agent, or Firm* — Kwan & Olynick LLP

(57) ABSTRACT

Provided are composite feedstock strips for additive manufacturing and methods of forming such strips. A composite feedstock strip may include continuous unidirectional fibers extending parallel to each other and to the principal axis of the strip. This fiber continuity yields superior mechanical properties, such as the tensile strength along strip's principal axis. Composite feedstock strips may be fabricated by slitting a composite laminate in a direction parallel to the fibers. In some embodiments, the cross-sectional shape of the slit strips may be changed by reattributing material at least on the surface of the strips and/or by coating the slit strips with another material. This cross-sectional shape change may be performed without disturbing the continuous fibers within the strips. The cross-sectional distribution of fibers within the strips may be uneven with higher concentration of fibers near the principal axis of the strips, for example, to assist with additive manufacturing.

20 Claims, 22 Drawing Sheets

(51) Int. Cl.
  *B29C 64/106* (2017.01)
  *B29C 64/141* (2017.01)
  *B33Y 70/00* (2015.01)
  *B29K 105/08* (2006.01)
  *B29K 105/16* (2006.01)

(52) U.S. Cl.
  CPC .......... *B29C 64/106* (2017.08); *B29C 64/141* (2017.08); *B29C 70/021* (2013.01); *B29C 70/08* (2013.01); *B29C 70/20* (2013.01); *B29C 70/386* (2013.01); *B29K 2105/08* (2013.01); *B29K 2105/16* (2013.01); *B29K 2995/0077* (2013.01); *B33Y 70/00* (2014.12)

(58) Field of Classification Search
  CPC ....... B29C 70/021; B29C 70/08; B29C 70/20; B29C 70/386; B29B 11/02
  See application file for complete search history.

(56) References Cited

U.S. PATENT DOCUMENTS

| | | | |
|---|---|---|---|
| 2007/0175572 A1* | 8/2007 | Rubin | B29C 70/525 156/196 |
| 2010/0189963 A1* | 7/2010 | Nair | B29C 70/202 428/195.1 |
| 2011/0064908 A1 | 3/2011 | Kweder | |
| 2013/0164498 A1 | 6/2013 | Langone et al. | |
| 2014/0328964 A1 | 11/2014 | Mark et al. | |
| 2017/0057165 A1 | 3/2017 | Waldrop, III et al. | |

OTHER PUBLICATIONS

"European Application No. 16183315.7, Search Report dated Feb. 24, 2017", 6 pgs.

Waldrop III, John C. et al., Composite Feedstock Strips for Additive Manufacturing and Methods of Forming Thereof, U.S. Appl. No. 14/835,323, filed Aug. 25, 2015, 42 pgs.

Waldrop III, John C. et al., "System and Method for Cutting Material in Continuous Fiber Reinforced Additive Manufacturing", U.S. Appl. No. 14/948,057, filed Nov. 20, 2015, 80 pgs.

"U.S. Appl. No. 14/835,323, Non Final Office Action dated Apr. 27, 2018", 9 pgs.

"U.S. Appl. No. 14/835,323, Examiner Interview Summary dated May 21, 2018", 3 pages.

"U.S. Appl. No. 14/835,323, Final Office Action dated Aug. 13, 2018", 7 pgs.

"Canadian Application Serial No. 2,932,827, Office Action dated Jul. 9, 2019", 5 pgs.

* cited by examiner

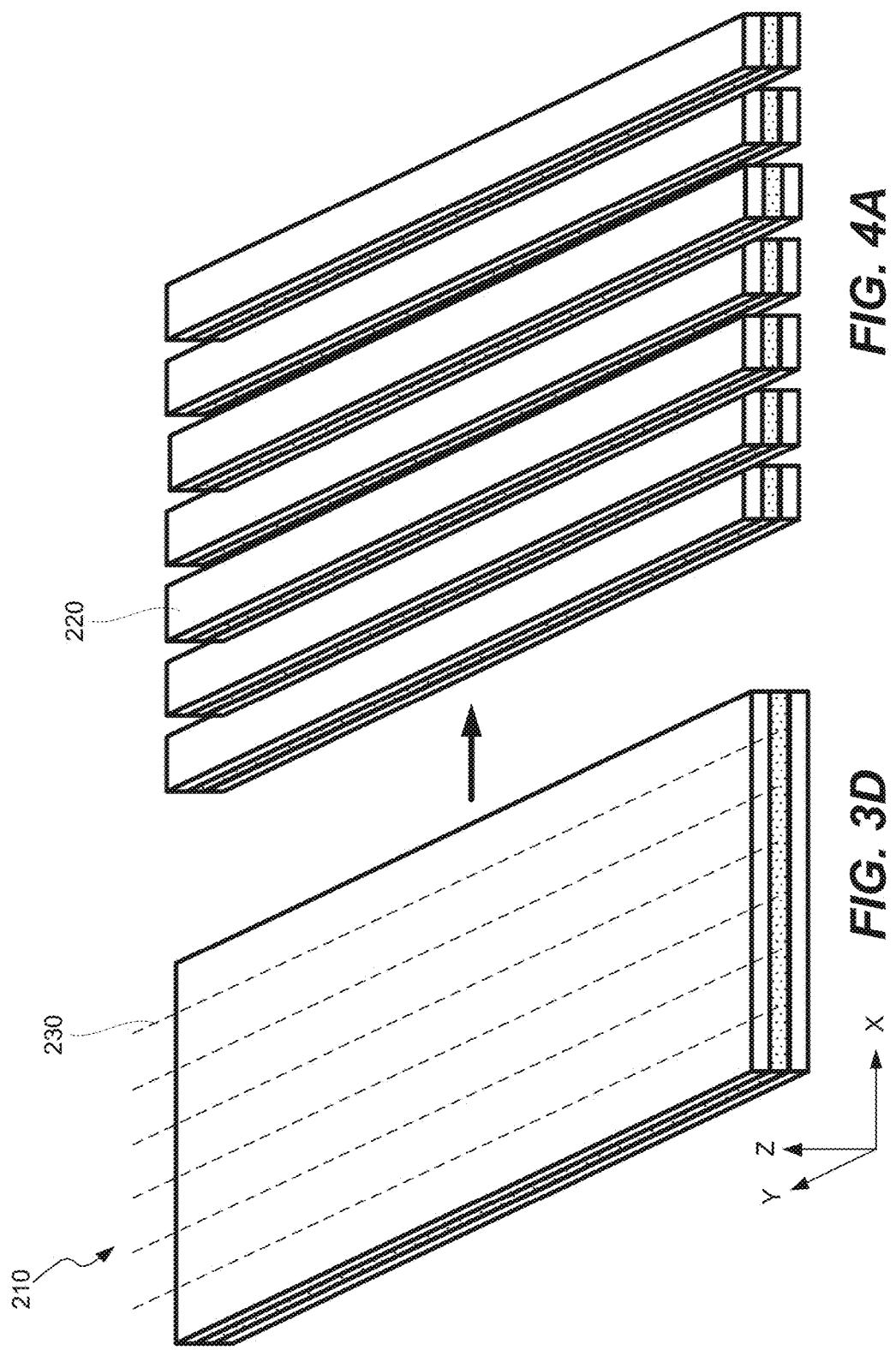

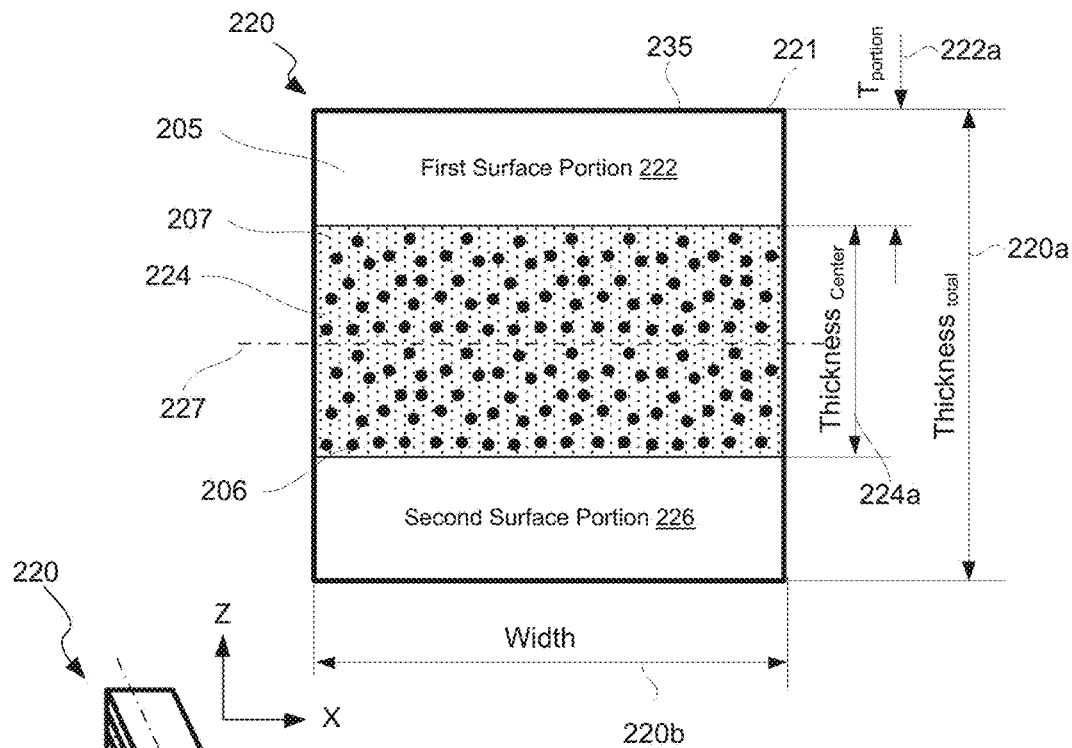
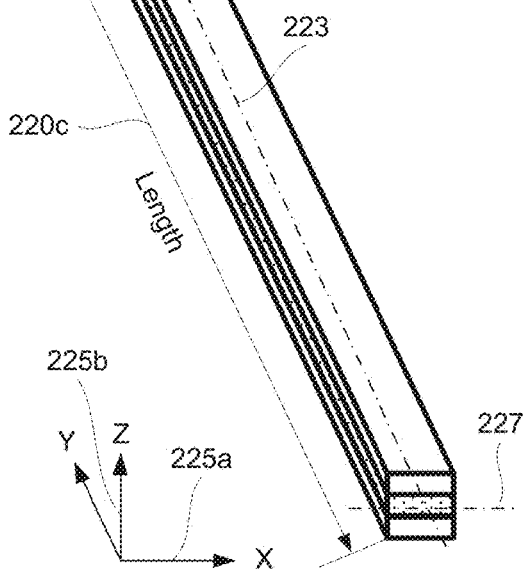
FIG. 4B
FIG. 4C

A-A

B-B

COMPOSITE FEEDSTOCK STRIPS FOR ADDITIVE MANUFACTURING AND METHODS OF FORMING THEREOF

CROSS-REFERENCE TO RELATED APPLICATION

This application is also a continuation-in-part of U.S. application Ser. No. 14/835,323, entitled "COMPOSITE FEEDSTOCK STRIPS FOR ADDITIVE MANUFACTURING AND METHODS OF FORMING THEREOF," filed on 25 Aug. 2015, which is incorporated herein by reference in its entirety for all purposes.

BACKGROUND

Additive manufacturing is a process of forming a three-dimensional (3D) object adding layers of material, such as plastic and metal. The process often relies on computer systems and, more specifically, on computer aided design (CAD) to design each layer and the overall layup process. Additive manufacturing is particularly attractive for complex, low volume parts that are frequently used in, for example, aerospace applications. Stereo lithography (SLA), selective laser sintering (SLS) and fused deposition modeling (FDM) are currently three primary methods used to make additively manufactured components. Typically, neat resins, which are materials without any structural supports (e.g., fibers), are used for this purpose. Incorporating structural supports into additive manufacturing feedstock proved to be difficult and generally limited to small particles and short fibers. However, these types of structural supports do not yield mechanical properties associated with continuous fibers. Furthermore, current techniques used for fabricating composite feedstock, such as extrusion, may cause voids and other defects in the feed stock. Finally, extrusion and other like techniques of fabricating composite feedstock are prone to clogging with structural supports.

SUMMARY

Provided are composite feedstock strips for additive manufacturing and methods of forming such strips. A composite feedstock strip may include continuous unidirectional fibers extending parallel to each other and to the principal axis of the strip. This fiber continuity yields superior mechanical properties, such as the tensile strength along strip's principal axis. Composite feedstock strips may be fabricated by slitting a composite laminate in a direction parallel to the fibers. In some embodiments, the cross-sectional shape of the slit strips may be changed by reattributing material at least on the surface of the strips and/or by coating the slit strips with another material. This cross-sectional shape change may be performed without disturbing the continuous fibers within the strips. The cross-sectional distribution of fibers within the strips may be uneven with higher concentration of fibers near the principal axis of the strips, for example, to assist with additive manufacturing.

Provided is a method of forming coated composite feedstock strips for additive manufacturing. In some embodiments, the method comprises slitting a sheet into composite feedstock strips and coating an outer surface of the composite feedstock strips. For example, the outer surface may be coated with a material comprising a second resin. This coating process forms a coating layer over the surface the composite feedstock strip. This combination of the coating layer and the composite feedstock strip is referred to as a coated composite feedstock strip.

The sheet used for slitting may comprise a first resin and continuous fibers extending parallel to each other within that sheet. The slitting may be performed along the direction parallel to the continuous fibers within the sheet thereby preserving continuity of the fibers. The coating may be performed using a cross-head extrusion coating technique or any other suitable technique, such as powder coating and solution-based coating technique In some embodiments, the distribution of the continuous fibers throughout the cross section of the composite feedstock strips is uniform prior to coating these strips. This fiber distribution is preserved during slitting. As such, the distribution of the continuous fibers throughout the cross section of the sheet used for slitting may be also uniform. However, once the slit strips are coated, this cross-sectional distribution changes since no continuous fibers may be used in the coating materials, e.g., the second resin. In some embodiments, the second resin may include different type of fibers or other types of fillers or may be substantially free from any fibers or fillers. For example, the concentration of non-resin components in the coating material may be less than 5% by volume or even less than 1% by volume.

Alternatively, the coating material may include a filler selected from the group consisting of fibers, particles, and flakes. For example, the filler may comprise discontinuous fibers, which are different from the continuous fibers of the sheet and later of the composite feedstock strips at least based on their aspect ratio. The filler may be selected from the group consisting of a heat sensitive additive, a mineral reinforcement, a thermal stabilizer, an ultraviolet (UV) stabilizer, a lubricant, a flame retardant, a conductive additive, and a pigment.

In some embodiments, one of the first resin and the second resin comprises one or more materials selected from the group consisting of polyethersulfone (PES), polyphenylenesulfide (PPS), polyetheretherketone (PEEK), poiyetherketoneketone (PEKK), polyetherimide (PEI), and thermoplastic polyimide (TPI). The first resin and the second resin are same. For example, the first resin and the second resin may be both polyetherketoneketone (PEKK).

In some embodiments, the thickness of the coating layer formed on the outer surface of the composite feedstock strips is uniform. This type of coating may be also referred to as a conformal coating. The thickness variation may be less than 20% or even less than 10%. In these embodiments, the cross section of the coated composite feedstock strip may represent a scaled up variation of the cross section of the composite feedstock strips prior to coating.

In some embodiments, the concentration of the continuous fibers throughout the cross section of the composite feedstock strips is at least about 40% by volume prior to coating these strips. Since fibers are not added or removed during slitting, the fiber concentration of the sheet slit into the continuous strips may be the same. This concentration may be controlled during fabrication of the sheet, for example, through selection of plies for lamination.

In some embodiments, the cross section of the composite feedstock strips or, more specifically, the cross-sectional profile remains same while coating the outer surface of the composite feedstock strips with the material. In other words, the coating process may not disturb the composite feedstock strips.

In some embodiments, the cross-sectional profile of the uncoated composite feedstock strips is selected from the group consisting of a rectangle, a square, and a trapezoid.

The cross-sectional profile of the coated composite feedstock strips is selected from the group consisting of an oval, a circle, a rectangle, a square, and a rounded corner rectangle, and a rounded corner square.

In some embodiments, the method further comprises forming the sheet used for slitting. This operation is performed prior to slitting the sheet and may involve forming a layup comprising fiber containing plies followed by laminating this layup. In some embodiments, all sheets of the layup are fiber containing plies. In these embodiments, the volumetric fraction of the continuous fibers within the laminated sheet may be constant. Alternatively, the layup may be formed from one or more fiber containing plies as well as one or more of resin plies. The resin plies may be free from fibers or any other fillers. In these alternative embodiments, the volumetric fraction of the continuous fibers within the laminated sheet varies throughout the thickness of the laminated sheet. For example, the volumetric fraction of the continuous fibers within the laminated sheet is greater at a center of the laminated sheet along the thickness of the laminated sheet than at one of surfaces of the laminated sheet.

In some embodiments, prior to coating the outer surface of the composite feedstock strips, the method may involve changing a cross-sectional profile of each of the composite feedstock strips. For example, the uncoated composite feedstock strips may include surface portions free from continuous fibers and materials from these surface portions may be redistributed thereby forming a new cross-sectional profile.

Provided also is a coated composite feedstock strip for additive manufacturing. In some embodiments, the coated composite feedstock strip comprises a composite feedstock strip and a coating layer disposed on the outer surface of the composite feedstock strip. The composite feedstock strip comprises a first resin and continuous fibers extending parallel to each other within the sheet. The coating layer may be forming a complete or a partial shell around the composite feedstock strip.

These and other embodiments are described further below with reference to the figures.

BRIEF DESCRIPTION OF THE DRAWINGS

FIG. 3D is a schematic perspective representation of the laminated sheet shown in FIG. 3A illustrating slitting directions, in accordance with some embodiments.

FIG. 4A is a schematic perspective representation of composite feedstock strips formed from the laminated sheet shown in FIG. 3D, in accordance with some embodiments.

FIG. 4B is a schematic cross-sectional representation of a composite feedstock strip, in accordance with some embodiments.

FIG. 4C is a schematic perspective representation of the composite feedstock strip shown in FIG. 4B, in accordance with some embodiments.

DETAILED DESCRIPTION

Figure 1A:
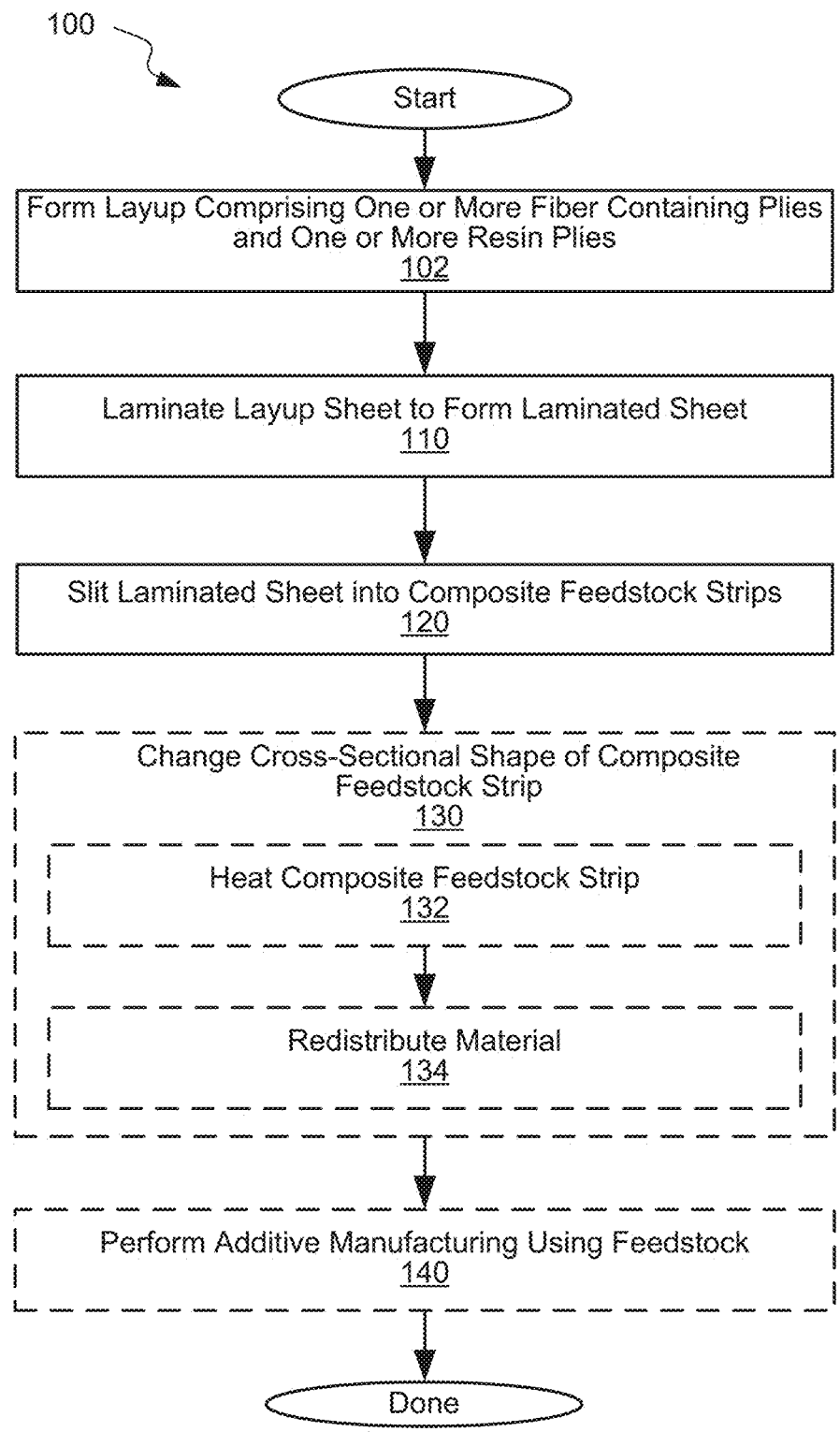
FIG. 1A is a process flowchart corresponding to a method of forming composite feedstock strips for additive manufacturing, in accordance with some embodiments.

In the following description, numerous specific details are set forth to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Many applications, such as aerospace, require parts with complex geometries yet low production volumes. While many techniques suitable for high production volumes, such as molding, have been developed overtime, these techniques are cost prohibitive and often do not produce parts with needed characteristics. Additive manufacturing has recently gained a lot of popularity in attempts to fill this void. However, many structural requirements (e.g., strength of fabricated components) cannot be easily achieved with current additive manufacturing techniques. For example, incorporating structural supports, such as fibers or particles, into additive manufacturing feedstock has been a major challenge. Even small fibers and particles tend to clog extruding nozzles when attempting to directly form feedstock with small cross-sectional profiles. Yet, small profiles are essential for fabricating parts with complex geometries, tight dimensional tolerances, and/or smooth surface finish.

One area of particular interest for composite materials in general and for composite parts formed using additive manufacturing in particular is using continuous fibers. Continuous fibers provide high strengths levels in the direction of the fiber. For example, a composite feedstock strip formed from a polyaryletherketone (PAEK) resin and filled with 30% by volume of chopped carbon fibers may have a tensile modulus of about 3 million pounds per square inch (MSI). At the same time, a composite feedstock strip formed from the same resin and filled with 35% by volume of continuous carbon fibers may have a tensile modulus of greater than 10 MSI. Furthermore, composite parts produced using continuous fiber feedstock are expected to have roughly six times the strength and ten times the stiffness of comparable unreinforced parts currently produced.

However, incorporating continuous fibers into additive manufacturing is even more challenging than incorporating short fibers and particles. Current additive manufacturing techniques are not simply capable of producing composite feedstock strip with continuous fibers at commercial scales. Handling of continuous fibers, maintaining continuity, and preserving orientations of fibers have proven to be major obstacles for conventional additive manufacturing techniques.

Described herein are composite feedstock strips for additive manufacturing and methods of forming such strips. These composite feedstock strips include continuous unidirectional fibers. More specifically, the fibers extend parallel to each other and to the principal axes of the strip. These feedstock strips may be produced from high grade composite plies and films without introducing voids or other types of defects.

A composite feedstock strip is formed by laminating a layup of one or more fiber-containing plies and one or more of resin plies. The position of these plies in the layup is used to control distribution of the fibers and other materials within the resulting strip. Furthermore, the orientation of all fiber-containing plies in the layup is such that all fibers in this layup are unidirectional. After lamination, the laminated sheet is slit into multiple composite feedstock strips. The slitting is performed along the direction parallel to the fibers in these strips. As such, the continuity of the fibers is preserved. The proposed methods of forming composite feedstock strips are low cost, applicable to a wide range of resin materials thermoplastic materials) and fiber materials, and can be easily tuned to produce different amounts and/or distribution of fibers within the feedstock strips. The feedstock can be used for fused deposition modeling (FDM) additive manufacturing technologies to produced composite parts. Composite feedstock strips include continuous unidirectional fibers and may be also referred to as reinforced feedstock strips or, more specifically, continuous fiber reinforced feedstock strips or rods.

Any planar plies may be used to form a layup, including but not limited to specialty plies, such aerospace grade fiber-containing plies, and the like. Furthermore, different layup arrangements may be used to achieve different distribution of fibers and other materials within resulting feedstock strips thereby opening doors for new and unique configurations of composite feedstock strips. Furthermore, this wide range of material options and arrangement options allow economical processing with minimal fiber disruption or buckling as well as continuous equipment runtime. Various continuous processing techniques, such as roll-to-roll processing, may be used for individual operations or a combination of multiple operations, such as a combination of forming a layup and laminating the layup as further described below.

A layup may be formed from continuous rolls of plies. One of these rolls may include a fiber-containing ply. The fibers in this ply may be continuous and extend in the direction of roll windings. In some embodiments, multiple rolls of the same or different fiber-containing plies may be used to form the same layup. Other plies may be resin plies, which may be free from fibers. A method may be a continuous process in which rolls containing one or more fiber-containing plies and one or more resin containing plies unwind, and the plies are continuously fed into processing equipment (e.g., a laminator) for consolidating all plies of the layup into a laminated sheet. In some embodiments, a slitter may also be a part of this continuous process. The slitter cuts the laminated sheet into individual composite feedstock strips, which could be formed into rolls for compact storage and shipping. This continuous process may also include a liquefier, which changes the cross-sectional profile of the composite feedstock strips. For example, the strips may have the square profile after slitting and then the circular profile after passing through the liquefier. Finally, additive manufacturing may also be a part of the continuous process.

In some embodiments, composite feedstock strips are coated. Addition of the coating after the composite feedstock strips are slits may be used to change their cross-sectional profile, to add material on the outer surface that is suitable for additive manufacturing or particular application, and/or to use composite feedstock strips that have higher concentrations of continuous unidirectional fibers (and have a higher overall fiber concentration even accounting for the coating layer, which may be free from fibers). For example, changing the cross-sectional profile by redistributing some material on the outer surface may be require a substantial amount of a fiber free material on the surface to avoid fiber disturbance. Some limitations may be imposed on the composition of these fiber free materials and/or processing conditions used during redistribution. On the other hand, coating of the slit strips with a material provides new material options, such as materials having fillers, to form uniform coating layers, and other features. In some embodiments, redistribution may be combined with coating.

During the additive manufacturing, the composite feedstock strips are used to form composite parts, usually parts with complex geometrical shapes. This continuous processing is generally faster and more controlled (e.g., better fiber orientation control) than conventional discrete processing, especially when some operations are performed by hand. One having ordinary skills in the art would understand that not all processing operations described above need to be performed. For example, composite feedstock strips may be used without changing their cross-sectional profiles. In some embodiments, the strips may be laid down and consolidated into a part using thermoplastic composite placement technique. Furthermore, additive manufacturing may be a part of a different process altogether. Finally, grouping of these processing operations may differ and may not necessarily be a part of one large group. For example, layup formation and lamination may be a part of one group. A roll of the laminated sheet may be formed after completing all operations in this group. This roll may be then slit into composite feedstock strips during a slitting operation belonging to another group. Yet another processing group may include cross-sectional profile changing operations.

Overall, provided composite feedstock strips have low cost and high quality and may be formed from a wide range of composite materials, in a wide range of configurations, as well as a wide range of cross-sectional sizes and profiles. These feedstock strips can be produced in large volumes to supply the needs of a continuous fiber reinforced additive manufacturing market. Comparable feedstock made directly using thermoplastic composite pultrusion processes have not been able to efficiently produce small diameter rod material particularly in the higher performance thermoplastic materials suitable for high end applications.

Examples of Composite Feedstock Strips and Forming Thereof

FIG. 1A is a process flowchart corresponding to method 100 of forming composite feedstock strips for additive manufacturing, in accordance with some embodiments. Method 100 may commence with forming a layup during operation 102 followed by laminating the layup during operation 110. A laminated sheet is formed during operation 110 and later slit into composite feedstock strips during operation 120. In some embodiments, the cross-sectional shape of the composite feedstock strips is changed during optional operation 130. This operation 130 may involve heating the composite feedstock strips during optional operation 132 and/or redistributing material during optional operation 134. Redistributing the material may be performed without impacting relative orientations of fibers in the composite feedstock strips. In some embodiments, method 100 may involve performing additive manufacturing during optional operation 140. The composite feedstock strips may be consumed during this operation to form a composite part. Each of these operations will now be described in more detail with reference to various figures illustrating components at various stages of method 100, equipment used to perform the described operations, and test samples.

Referring to operation 102, which involves forming a layup, the layup formed during this operation may include one or more fiber containing plies and one or more resin plies. As further described below, the one or more resin plies may not include fibers. Even if fibers are included in the one or more of resin plies, these fibers are different from the one or more fiber containing plies, which include continuous unidirectional fibers.

Figure 2A:
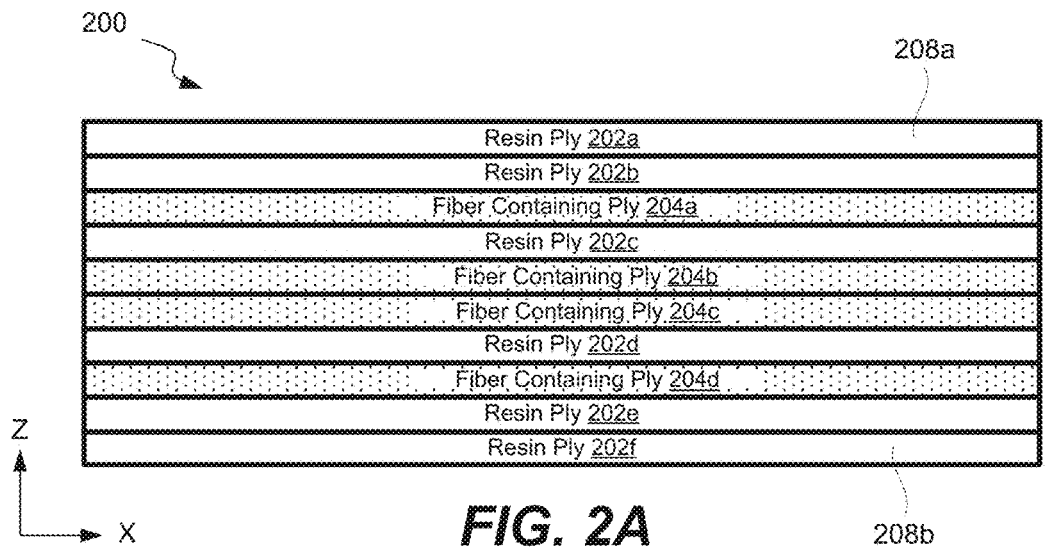
FIG. 2A is a schematic cross-sectional representation of a layup including multiple resin plies and fiber containing plies, in accordance with some embodiments.

Referring to FIG. 2A illustrating one example of layup 200, this particular layup includes four fiber containing plies 204a-204d and six resin plies 202a-202f. The number, thickness, and arrangement of fiber containing plies 204 and resin plies 202 may be used to control, at least in part, the cross-sectional distribution of materials within laminated sheet 210 shown in FIG. 3A (formed by laminating layup 200). This material may be maintained, at least to some extent, in composite feedstock strips 220, which are formed by slitting laminated sheet 210 as further described below. Furthermore, the number and the thickness of plies 202 and 204 may be used to control thickness 210a of laminated sheet 210, which in turn controls the cross-sectional dimension of composite feedstock strips 220.

Resin plies 202 used to form layup 200 may be free from fibers. All continuous unidirectional fibers may be provided in fiber containing plies 204. In some embodiments, resin plies 202 may include other types of fillers, such as particles and/or short multidirectional fibers. Referring to FIG. 2A, in some embodiments, at least one outer ply 208a of layup 200 is resin ply 202. More specifically, both outer plies 208a and 208b may be resin plies 202. All other plies of layup 200, including fiber containing plies 204 and, in some embodiments, other resin plies 202, are disposed between outer plies 208a and 208b. In some embodiments, multiple outer plies on each side of layup 200 are resin plies 202. The example presented in FIG. 2A illustrates two resin plies 202a and 202b on one side of layup 200 and two resin plies 202e and 202f on the other side of layup 200. This type of arrangement may be used to ensure that sufficiently thick surface portions of layup 200 and then of laminated sheet 210 and eventually of composite feedstock strips 200 are free from fibers to allow changing cross-sectional shapes of composite feedstock strips 200.

In some embodiments, resin plies 202 comprise one or more materials selected from the group consisting of polyethersulfone (PES), polyphenylenesulfide (PPS), polyetheretherketone (PEEK), polyetherketoneketone (PEKK), polyetherimide (PEI), and thermoplastic polyimide (TPI). More specifically, one or more resin plies 202 comprise polyethersulfone (PES). All resin plies 202 forming the same layup 202 may have the same composition. Alternatively, different resin plies 202 forming the same lay up may have different compositions.

In some embodiments, fiber containing plies 204 comprise one or more materials selected from the group consisting of polyethersulfone (PES), polyphenylenesulfide (PPS), polyetheretherketone (PEEK), polyetherketoneketone (PEKK), polyetherimide (PEI), and thermoplastic polyimide (TPI). These materials may be referred to matrix resins and should be distinguished from the resin of resin plies 202. More specifically, fiber containing plies 204 may comprise polyetherketoneketone (PEKK).

The resin used in fiber containing plies 204 may be the same or different than the resin used in resin plies 202. For example, resin plies 202 may comprise polyethersulfone (PES), while fiber containing plies 204 may comprise polyetherketoneketone (PEKK). In some embodiments, resin plies 202 may include polyetherketoneketone (PEKK), while fiber containing plies 204 may comprise polyphenylenesulfide (PPS). In some embodiments, resin plies 202 may include polyetherketoneketone (PEKK), while fiber containing plies 204 may comprise polyetherketoneketone (PEKK).

One or more resins used in fiber containing plies 204 and in resin plies 202 may be thermoplastic resins. In some embodiments, one or more resins used in fiber containing plies 204 and in resin plies 202 may include a thermoset resin. The thermoset resin, if used, may be combined with one or more thermoplastic resins (e.g., used as a filler). Furthermore, when the thermoset resin is used, fiber containing plies 204 and/or resin plies 202 containing this resin may be heated, for example, above the glass transition temperature of that thermoset resin.

The thickness of each resin ply 202 may be between about 0.001 inches and 0.020 inches or, more specifically, between 0.002 inches and 0.010 inches. The thickness of each fiber containing ply 204 may be between about 0.003 inches and 0.015 inches or, more specifically, between 0.005 inches and 0.010 inches.

Figure 2B:
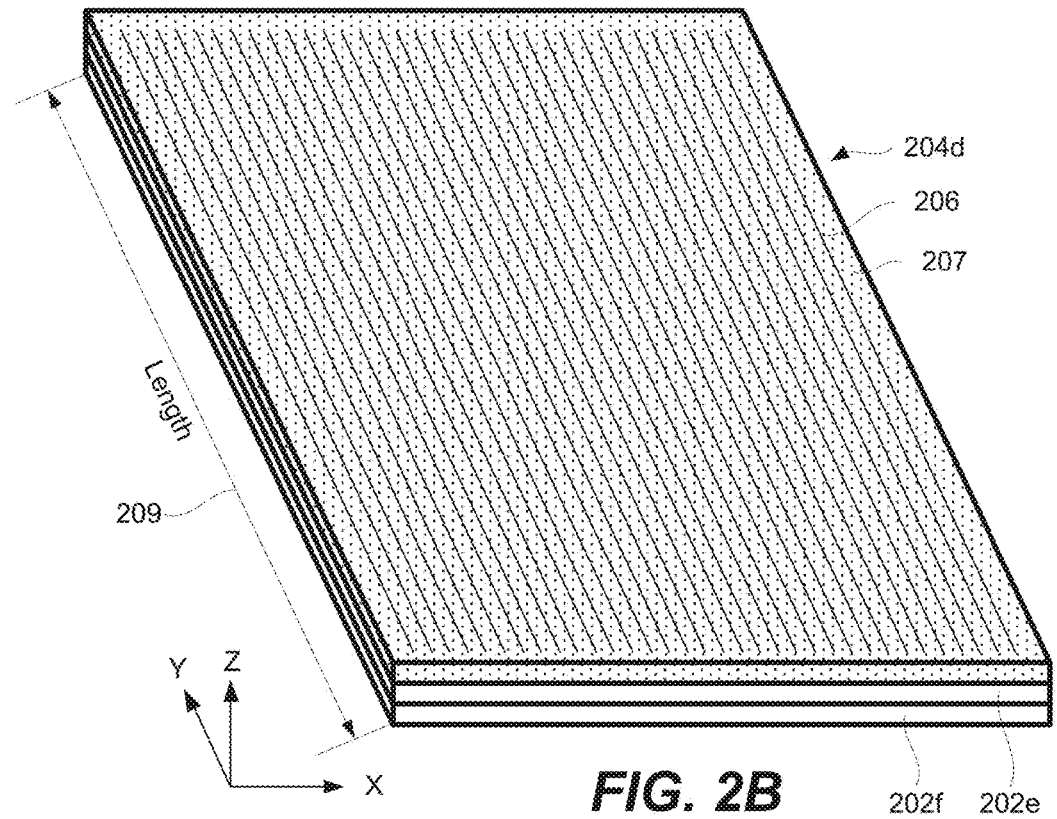
FIG. 2B is a schematic perspective representation of a portion of the layup shown in FIG. 2A illustrating orientations of fibers in one of the fiber containing plies, in accordance with some embodiments.

Referring to FIG. 2B, continuous fibers 206 of fiber containing plies 204 may be any suitable fibrous components, such as glass (S-type or E-type), quartz, aramid, carbon fibers, carbon nanotubes, or combinations thereof. Substantially all (e.g., more than 90%) fibers 206 within each fiber containing ply 204 are continuous and oriented in a unidirectional arrangement as, for example, shown in FIG. 2B illustrating fibers 206 extending along the Y axis. The unidirectional arrangement may be also referred to as 0/0 arrangement. Specifically, all fibers 206 in all fiber containing plies 204 forming layup 200 are parallel to each other. One having ordinary skills in the art would understand that the term parallel allows for some tolerance such as less than about ±5° or even less than about ±2°.

Other types of fiber orientations (not unidirectional) may interfere with subsequent slitting of laminated sheet 210 but may nonetheless be applicable for forming composite feedstock strips 220 in accordance with the methods described herein. One of ordinary skill in the art would recognize that the type, cross-sectional dimensional, amount of fibers 206 within fiber containing plies 204, as well as the type of the matrix resin utilized in fiber containing plies 204 and the resin used in resin plies 202 may vary, based on numerous factors, including cost and the ultimate desired physical and mechanical properties of composite feedstock strips 220.

In some embodiments, all fiber containing plies 204 forming layup may be initially provided in rolls, e.g., prepreg tapes. Fibers 206 in these fiber containing plies 204 may extend along the winding direction of these rolls. When multiple fiber containing plies 204 are used all plies are precisely oriented with respect to each other in layup 200 to ensure that all fibers 206 in layup 200 are parallel to each other (unidirectional).

Figure 7A:
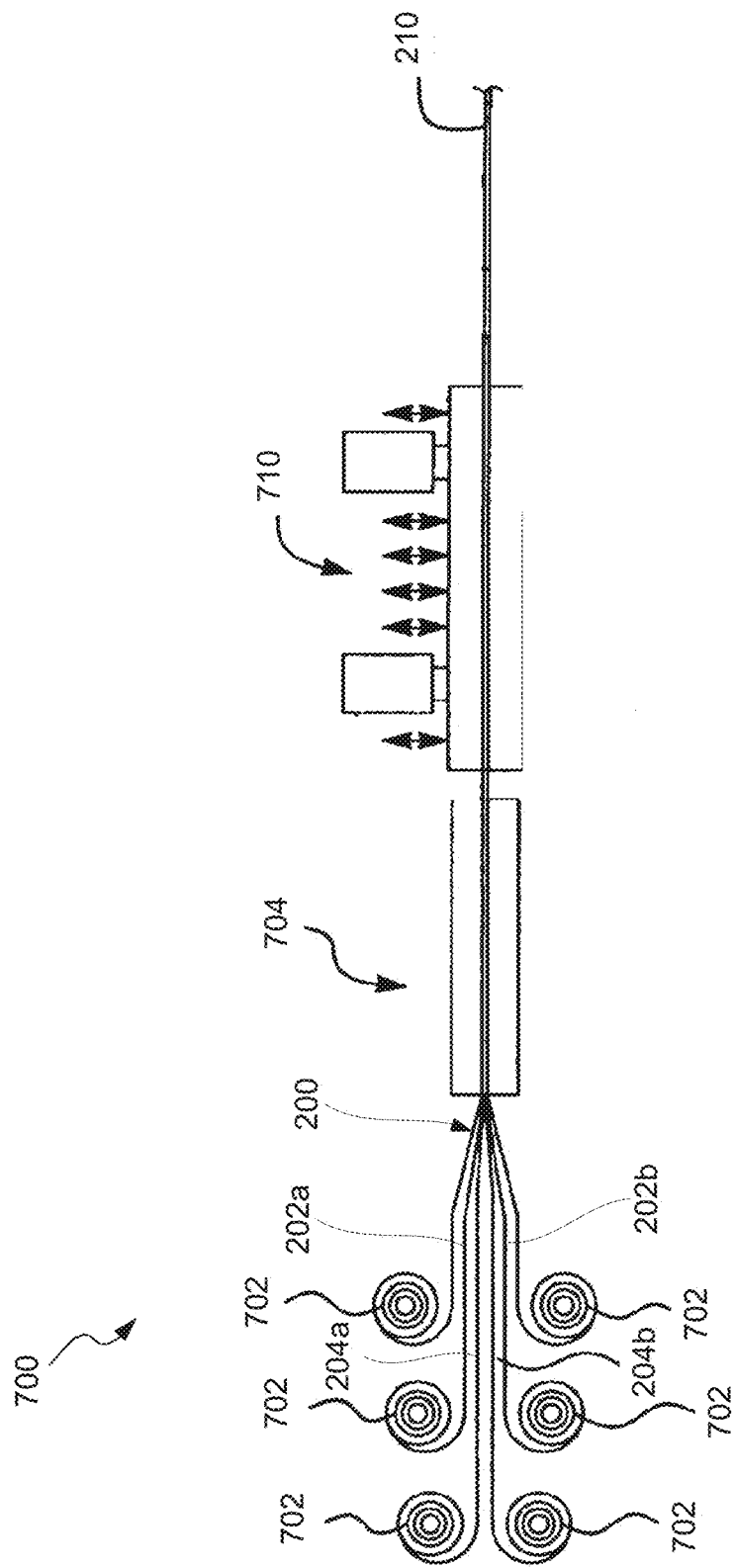
FIG. 7A is a schematic representation of an apparatus used for forming a laminated sheet, in accordance with some embodiments.

In some embodiments, forming layup 200 is performed in a roll-to-roll process. Referring to FIG. 7A, fiber containing plies 204a and 204b and resin plies 202a and 202b may be unrolled from respective rolls 702 and form layup 200 upon entering preheating zone 704. These continuous sheet forming processes, as with roll-to-roll handling, can be performed in a double belt press, roll pultrusion machine, or continuously compressed in molding machines.

Returning to FIG. 1A, after completing operation 102, method 100 continues with laminating layup 200 during operation 110. During this operation, laminated sheet 210 is formed. Specifically, the material of all resin sheets 202 and all fiber containing sheets 204 may be consolidated during this operation. At the same time, the unidirectional orientation of fibers 206 may be preserved. Fibers 206 may move closer to each other during this operation or otherwise change their orientation within the cross-section. For example, when multiple fiber containing plies 204 are used to form layup, fibers 206 in one of these fiber containing plies 204 may move closed to fibers in another one of these fiber containing plies 204. In some embodiments, the orientation of fibers 206 provided in each of fiber containing plies 204 may remain substantially the same. For example, fiber containing plies 204 may be previously consolidated. Alternatively, one layup 200 is formed, relative orientation of fibers 206 may remain the same during lamination operation 110.

Continuing with FIG. 1A and operation 110, this laminating operation 110 may involve heating and compressing layup 200. In some embodiments, operation 110 may be performed in a continuous manner (e.g., in a roll-to-roll manner) using, for example, apparatus 700 shown in FIG. 7A. Specifically, apparatus 700 may include preheating zone 704 for pre-heating layup to a lamination temperature. One having ordinary skills in the art would understand that the lamination temperature may depend on the resins used in fiber containing plies 204 and resin plies 202, thickness of these plies, and other process parameters. In general, the lower temperature limit should be sufficient to ensure melt consolidation of different plies forming layup 200 and to a certain extent flow of materials (other than fibers 206) forming layup. On the other hand, the upper temperature limit may need to be controlled to maintain orientation of fibers 206 during consolidation of the plies into laminate sheet 210 and to prevent thermal degradation.

During operation 110, heated layup 200 may be fed from preheating zone 704 into lamination zone 710, which may be also referred to as a consolidation zone. In lamination zone, layup 200 is consolidated to form single integrated laminate sheet 210. As layup 200 moves forward through lamination zone 710, it may be continuously heated at least through initial part of consolidation zone 710.

Figure 3A:
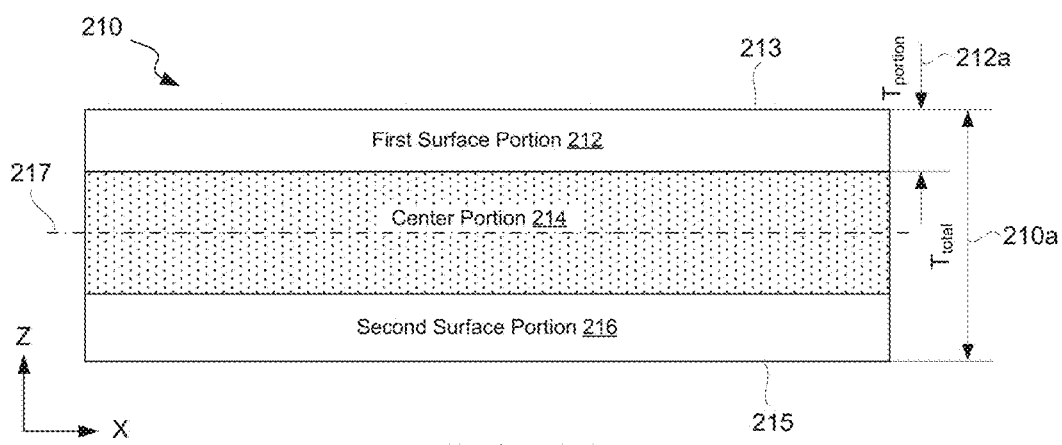
FIG. 3A is a schematic cross-sectional representation of a laminated sheet formed from the layup shown in FIG. 2A, in accordance with some embodiments.

One example of laminated sheet 210 is shown in FIG. 3A. Thickness 210a (shown as $T_{total}$ in FIG. 3A) of laminated sheet 210 extends between two surfaces 213 and 215 of that sheet. In some embodiments, the thickness of laminated sheet 210 ($T_{total}$) is less than about 0.060 inches or, more specifically, less than about 0.050 inches or even less than about 0.040 inches. It should be noted that the thickness of laminated sheet 210 ($T_{total}$) determines the cross-section of composite feedstock strips 220 as further described below with reference to FIG. 4B. Also shown in FIG. 3A is center plane 217 of laminated sheet 210 positioned at equal distances between two surfaces 213 and 215 of that sheet.

In some embodiments, the volumetric fraction of fibers 206 within laminated sheet 210 varies throughout the thickness of laminated sheet 210. For purposes of this document, a volumetric fraction is defined as a ratio of the volume of one component (e.g., fibers 206) to the overall volume of the structure containing this component. When the volumetric fraction is discussed with a reference to the cross-section of a structure, the volumetric fraction may be presented as a ratio of cross-sectional areas (i.e., a ratio of the cross-sectional area of the component in question to the overall cross-sectional of the entire structure). The variability of the volumetric fraction of fibers 206 within laminated sheet 210 may be attributed to the arrangement of one or more fiber containing plies 204 and one or more of resin plies 202 in layup 210 as well as the composition of each ply.

The example of laminated sheet 210 presented in FIG. 3A includes two surface portions 212 and 216. Specifically, surface portion 212 forms first surface 213 of laminated sheet 210, while surface portion 216 forms second surface 215. Both portions 212 and 216 may be substantially free from fibers 206. Center portion 214 may include all fibers 206 of laminated sheet 210. For clarity, center portion 214 is disposed between two surface portions 212 and 216. This is an example of concentrating fibers 206 around center plane 217 of laminated sheet 210. This type of distribution may be achieved by forming surface portions 212 and 216 from resin plies 202 only. In this example, resin plies 202 are free from fibers. At the same time, center portion 214 may be formed from various one or more fiber containing plies 204. In some embodiments, one or more resin plies 202 may be also used to form center portion. Referring to the example of layup 200 shown in FIG. 2A, first surface portion 212 may be formed from resin plies 202a and 202b, while second surface portion 216 may be formed from resin plies 202e and 202f. Center portion 214 may be formed from fiber containing plies 204a-204d as well as resin plies 202c and 202d. This arrangement and number of fiber containing plies 204 and resin plies 202 is selected to achieve a desired thickness of center portion 214 as well as distribution of fibers within center portion 214 and laminated sheet 210 overall.

Referring to FIG. 3A, a ratio of thickness 212a of surface portion 212, which may be free from fibers 206, to total thickness 210a of laminated sheet 210 ($T_{portion}/T_{total}$) may be between about 5% and 45% or, more specifically, between about between about 10% and 30%. This fiber-free portion 212 allows changing the cross-sectional profile of composite feedstock strips 220 without disturbing fibers 206 as further described below with reference to FIGS. 5B-5C.

Figure 8A:
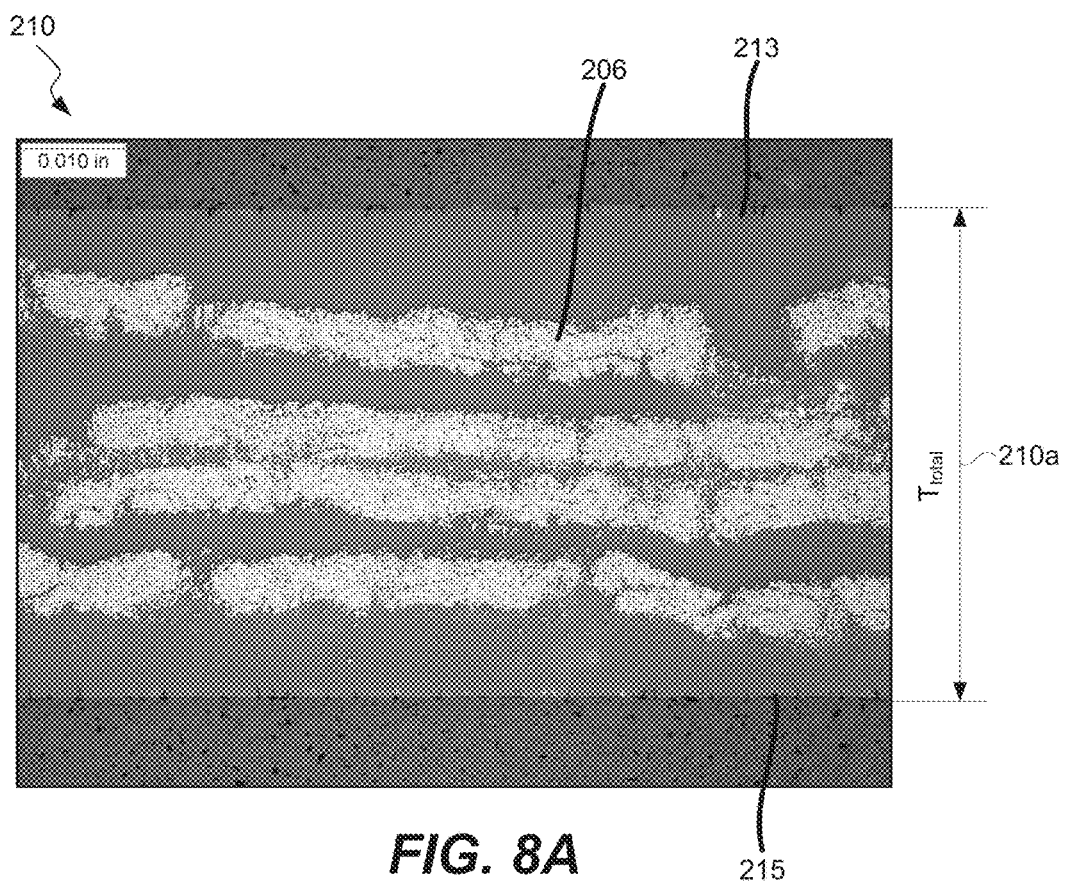
FIG. 8A is a photo of a cross-section of a composite feedstock strip used in a test.

FIG. 8A illustrates a cross-sectional image of a test laminate sheet (having ply arrangements similar to the example shown in FIG. 2A and described above). This cross-sectional image of FIG. 8A illustrates an actual distribution of fibers throughout the cross-section of the test sample. Specifically, this test laminate sheet was prepared using the following layup: two PES plies/carbon-PEKK ply/PES ply/two carbon-PEKK plies/PES ply/carbon-PEKK ply/two PES plies. The carbon-PEKK plies included above 60% of carbon fibers and each had a thickness of about 0.0054 inches. The PES plies were each 0.005 inches in thickness. The horizontal white patches are cross-sections of fibers 206 provided by in the carbon-PEKK plies. There are four distinct groupings of these white horizontal patches, each grouping corresponding to a separate carbon-PEKK ply. The patches are clearly positioned away from surfaces 213 and 215 of this test laminate sheet corresponding to the model presented in FIG. 3A and described above.

Figure 3B:
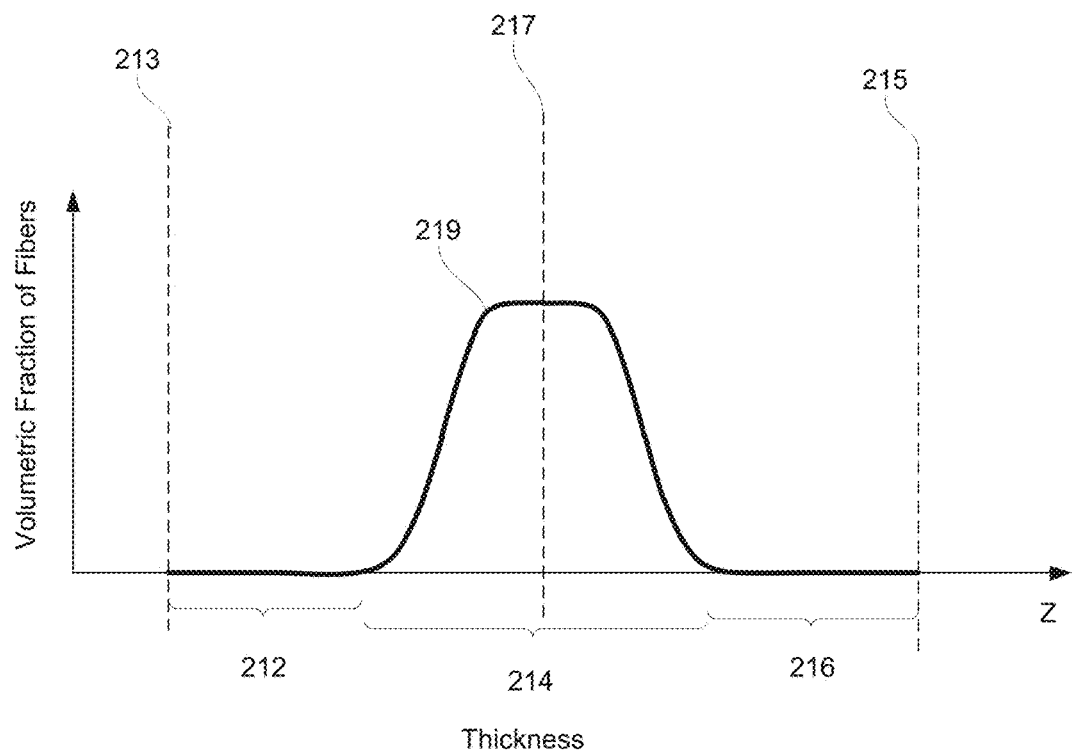
FIG. 3B is a schematic plot showing volumetric fraction of fibers as a function of location along the thickness of a laminated sheet, in accordance with some embodiments.

Referring to FIGS. 3A-B and FIG. 8A, the volumetric fraction of fibers 206 within laminated sheet 210 is greater at center plane 217 of laminated sheet 210 than at one or both surfaces 213 and 215. Specifically, FIG. 3B illustrates one example of volumetric fraction profile 219 based on the location along the thickness direction (the Z axis). This figure identifies surface portions 212 and 216, being free from fibers, and center portion 214, containing all fibers 206. Since surface portions 212 and 216 are free from fibers, the volumetric fraction in these portions is at a zero level. In some embodiments, volumetric fraction profile 219 is symmetric with respect to center plane 217 of laminated sheet 210 as, for example, shown in FIG. 3B. This symmetric profile may be achieved by a symmetric position of plies in layup 200, such as in the example illustrated in FIG. 2A.

In some embodiments, the average of volumetric fraction of fibers 206 within entire laminated sheet 210 is between about 1% and 60% on average or, more specifically, between about 10% and 50% or even between about 20% and 40%. This characteristic may be also referred to as a total fiber loading. However, unlike most of conventional composite materials, laminated sheet 210 has uneven distribution of fibers 206.

Returning to FIG. 1A, method 100 may continue with slitting laminated sheet 210 into composite feedstock strips 220 during operation 120. During this operation laminated sheet 210 is turned into composite feedstock strips 220. Slitting may be performed using one of waterjet slitting, rotational cutting, pressure wheel slitting, or roll slitting. Furthermore, slitting the laminated sheet 210 into the composite feedstock strips 220 is performed in a roll-to-roll process.

Referring to FIGS. 3D and 4A, slitting may be performed along direction 230 parallel to all fibers 206 with laminated sheet 210. As such, slitting does not disturb the continuity of fibers 206, i.e., does not cut fibers. Cross-sectional profile 221 of each of composite feedstock strips 220 formed during operation 120 may be a square as, for example, shown in FIGS. 4A-4C. More generally, cross-sectional profile 221 may be a rectangle. This type of profile 221 is a result of slitting in the direction substantially perpendicular to surfaces 213 and 215 of laminated sheet 210. This square or rectangular profile may be later converted into a round profile, e.g., a circular profile or an oval profile.

Referring to FIGS. 4B and 4C, all fibers 206 in each composite feedstock strip 220 are parallel to primary axis 223 of that strip. For purposes of this document, primary axis 223 is defined as an axis extending along the longest dimension of composite feedstock strip 220, such as its length 220c as shown in FIG. 4C. As described above, all fibers 206 are parallel in laminated sheet 210 prior to its slitting. Furthermore, slitting is performed along the direction parallel to the fibers. As a result, all fibers 206 remain parallel (as defined above) to each other in composite feedstock strip 220 and extend parallel to primary axis 223 of the strip. This continuous and unidirectional orientation of fibers results in superior tensile strength and other mechanical characteristics of composite feedstock strip 220. For example, tensile strength of over 90 ksi have been measured in some representative test strips.

Figure 6A:
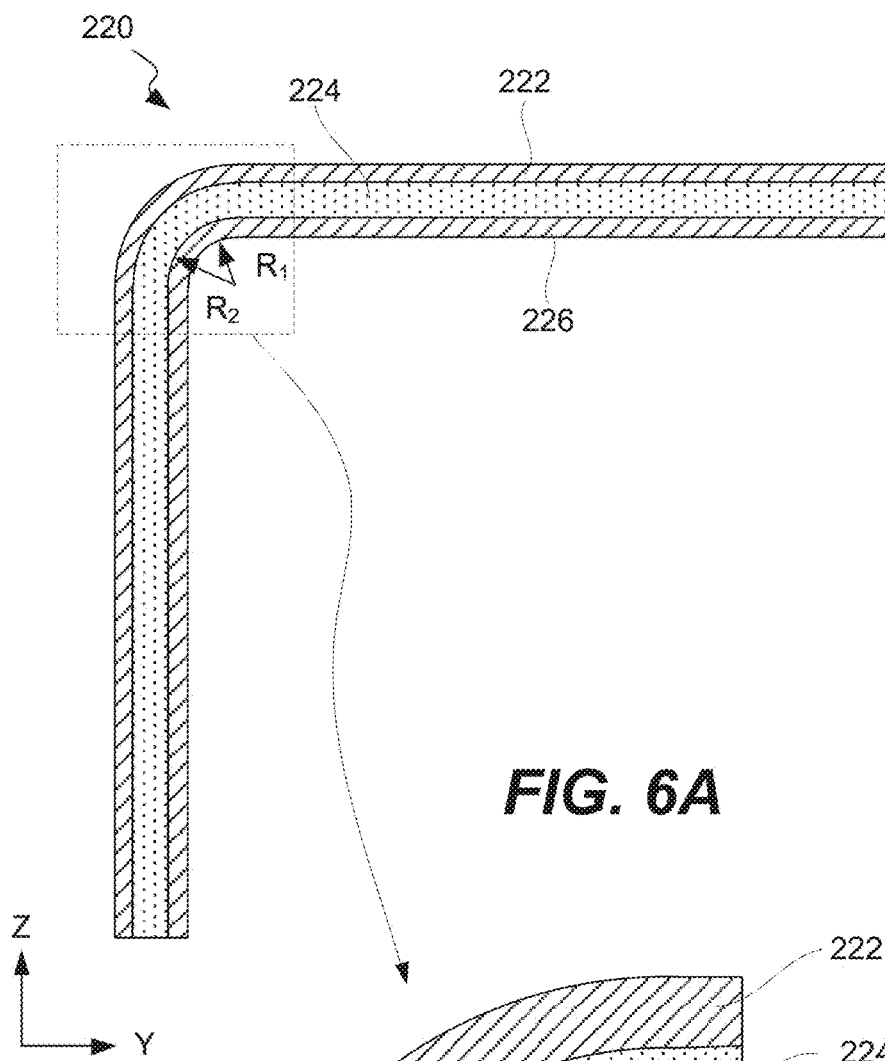
FIGS. 6A and 6B are schematic cross-sectional representations of a bent composite feedstock strip, in accordance with some embodiments.
Figure 6B:
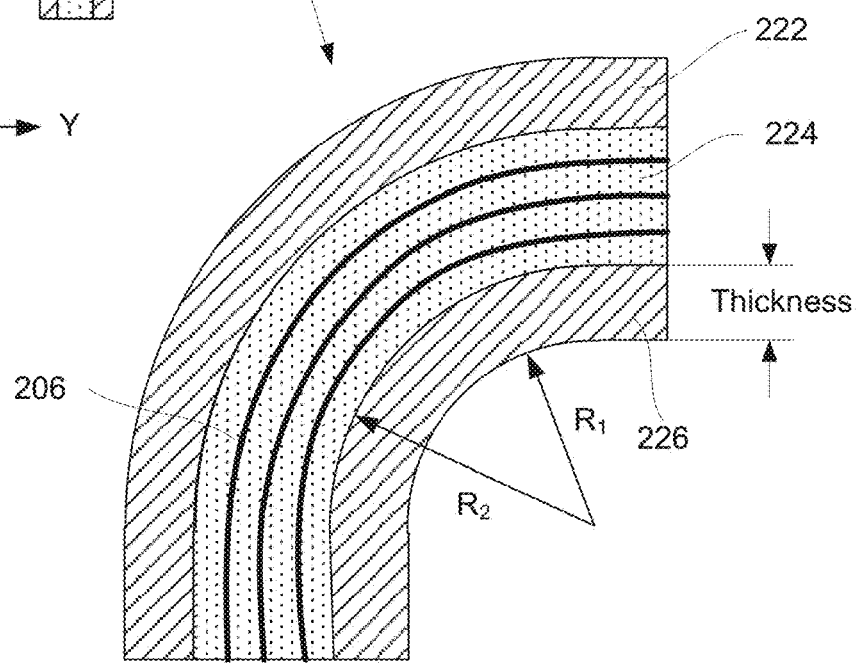

At the same time, composite feedstock strip 220 may be bendable in directions perpendicular to its primary axis 223. This bending capability is provided by the unidirectional orientation of fibers 206 and, in some embodiments, by uneven distribution of fibers 206 within composite feedstock strip 220. Specifically, FIGS. 6A and 6B illustrate a cross-section of strip bent 90°. Second surface portion 226 experiences a sharper bend radius ($R_1$) than the bend radius ($R_2$) of center portion 224. At the same time, surface portions 226 may be free from fibers 206 and, as a result, may be more malleable than center portion 204. The fiber distribution allows composite feedstock strip 220 to be coiled in small diameter packages for storage, shipment, and subsequent use in additive manufacturing.

Figure 5A:
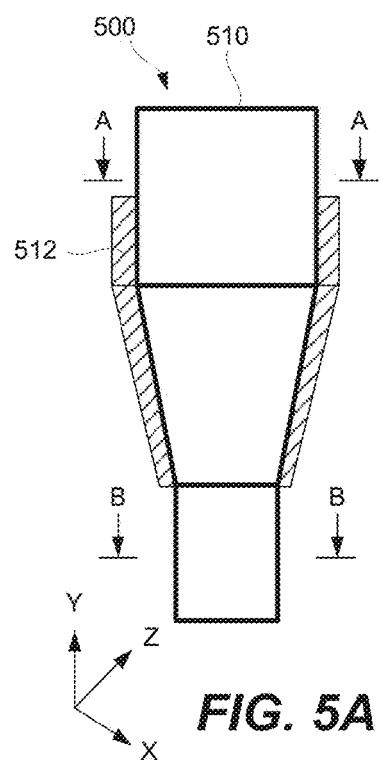
FIG. 5A is a schematic representation of a liquefier used for changing the cross-sectional profile of composite feedstock strips, in accordance with some embodiments.

In some embodiments, fibers 206 may have an average length of at least 100 feet or even at least about 1000 feet in composite feedstock strips 220. This reflects the continuity aspect of fibers in composite feedstock strips 220. At the same time, the principal cross-sectional dimension 220d of composite feedstock strips 220 after reforming, as for example shown in FIG. 5C, may be less than about 0.060 inches or, more specifically, less than about 0.050 inches or even less than about 0.040 inches. This small cross-sectional dimension 220d may be needed for additive manufacturing. If the cross-sectional profile of composite feedstock strip 220 is a circle, then its principal cross-sectional dimension 220d is the diameter of the circle as shown in FIG. 5C. However, if the cross-sectional profile of composite feedstock strip 220 is a square, then its principal cross-sectional dimensions are width 220b and thickness 220a, which are the same as shown in FIG. 4B.

Returning to FIG. 1A, method 100 may involve changing the cross-sectional profile of each composite feedstock strip during optional operation 130. For example, the cross-sectional profile of each composite feedstock strip may be changed from being a square (after slitting of the laminated sheet) to a circle or a hexagon. Currently, the nozzles used for additive manufacturing have round profiles to help with directional changes while applying materials. As such, having round or similar (close to being round) cross-sectional profile of composite feedstock strips 220 may help during additive manufacturing. However, additive manufacturing techniques may be developed to use other feedstock strips with other types of cross-sectional profiles. The current methods allow forming many different types of profiles without disturbing orientation of continuous fibers or their continuity.

Figure 5B:
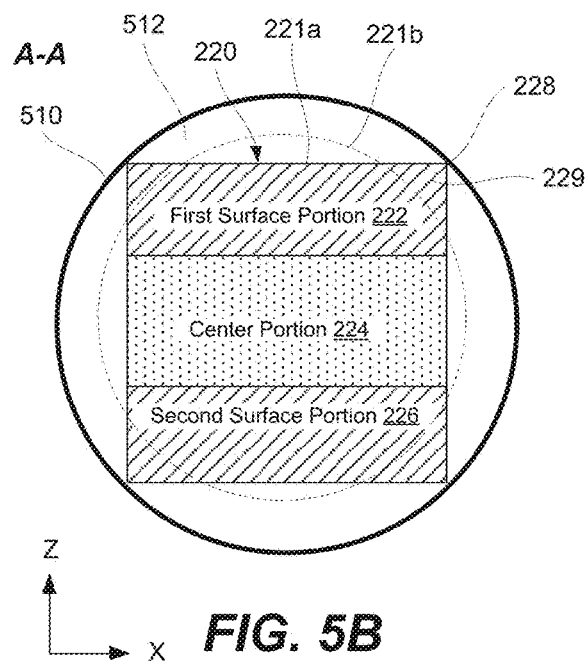
FIG. 5B is a schematic cross-sectional representation of a composite feedstock strip entering the liquefier shown in FIG. 5A, in accordance with some embodiments.
Figure 5C:
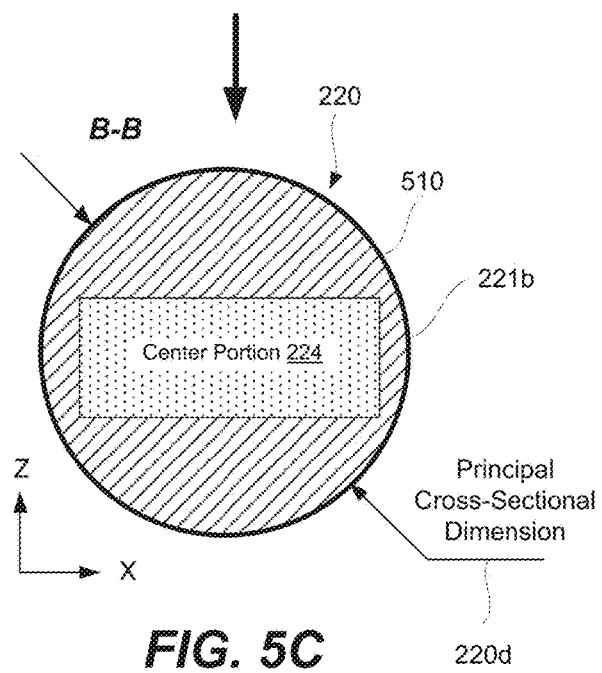
FIG. 5C is a schematic cross-sectional representation of the composite feedstock strip leaving the liquefier shown in FIG. 5A, in accordance with some embodiments.

Operation 130 may involve heating (block 132 in FIG. 1A) composite feedstock strip 220 and redistributing (block 134 in FIG. 1A) material 229 away from corners 228 of cross-sectional profile 221a as shown in FIGS. 5B and 5C. Specifically, FIG. 5B illustrates composite feedstock strip 220 disposed within form 510. The cross-sectional profile of form 510 may be round. However, the diameter of form 510 at this location (identified as A-A and referring to FIG. 5A) is greater than the diameter of final cross-sectional profile 221b identified with a dash line in FIG. 5B. At this location, corners 228 of composite feedstock strip 220 contact form 510. It should be noted that corners 228 extend outside of the boundary of final cross-sectional profile 221b and any such outside material will be brought within the boundaries (e.g., by filling voids) during operation 130. In some embodiments, material 229 redistributed away from the corners 228 is free from fibers 206.

This redistribution of the outside material during operation 130 may be performed without substantial impact on the material that is within the boundary of final cross-sectional profile 221b. Specifically, the position of continuous fibers 206 within composite feedstock strip 220 is retained during operation 130 as, for example, illustrated with FIGS. 5B and 5C showing static cross-sectional profile of center portion 224 of composite feedstock strip 220. This may be achieved by selective heating of corners 228 of composite feedstock strip 220 attributable to the direct contact of corners 228 with heated form 510. The remaining portion of composite feedstock strip 220 may be heated less than corners due to the heat insulating nature of the materials forming composite feedstock strip 220 and speed with which operation 130 is performed. Specifically, during operation 130, center portion 224 comprising continuous fibers 206 may have a lower temperature than material 229 being redistributed away from corners 228. As noted above, material 229 may be free from continuous fibers 206.

Changing cross-sectional profile operation 130 may be performed using liquefier 500, one example of which is shown in FIG. 5A. Liquefier 500 may include form 510 with a tapered cross-sectional profile and heater 512 for heating form 510. Because continuous fibers 206 of composite feedstock strip 220 are unidirectional and continuous, composite feedstock strip 220 can be easily fed through liquefier 500 without clogging it (which is a common problem with chopped continuous fibers and particles used as structural supports in composites). Furthermore, composite feedstock strip 220 may substantially retain its tensile strength while being fed through liquefier 500 again due to the continuous nature of continuous fibers 206, which simplifies handling composite feedstock strip 220 during operation 130.

In some embodiments, operation 130 is not performed. Composite feedstock strips 220 having a rectangular or a square profile may be used for subsequent processing. Method 100 may also involve performing 140 additive manufacturing using composite feedstock strips 220.

Figure 1B:
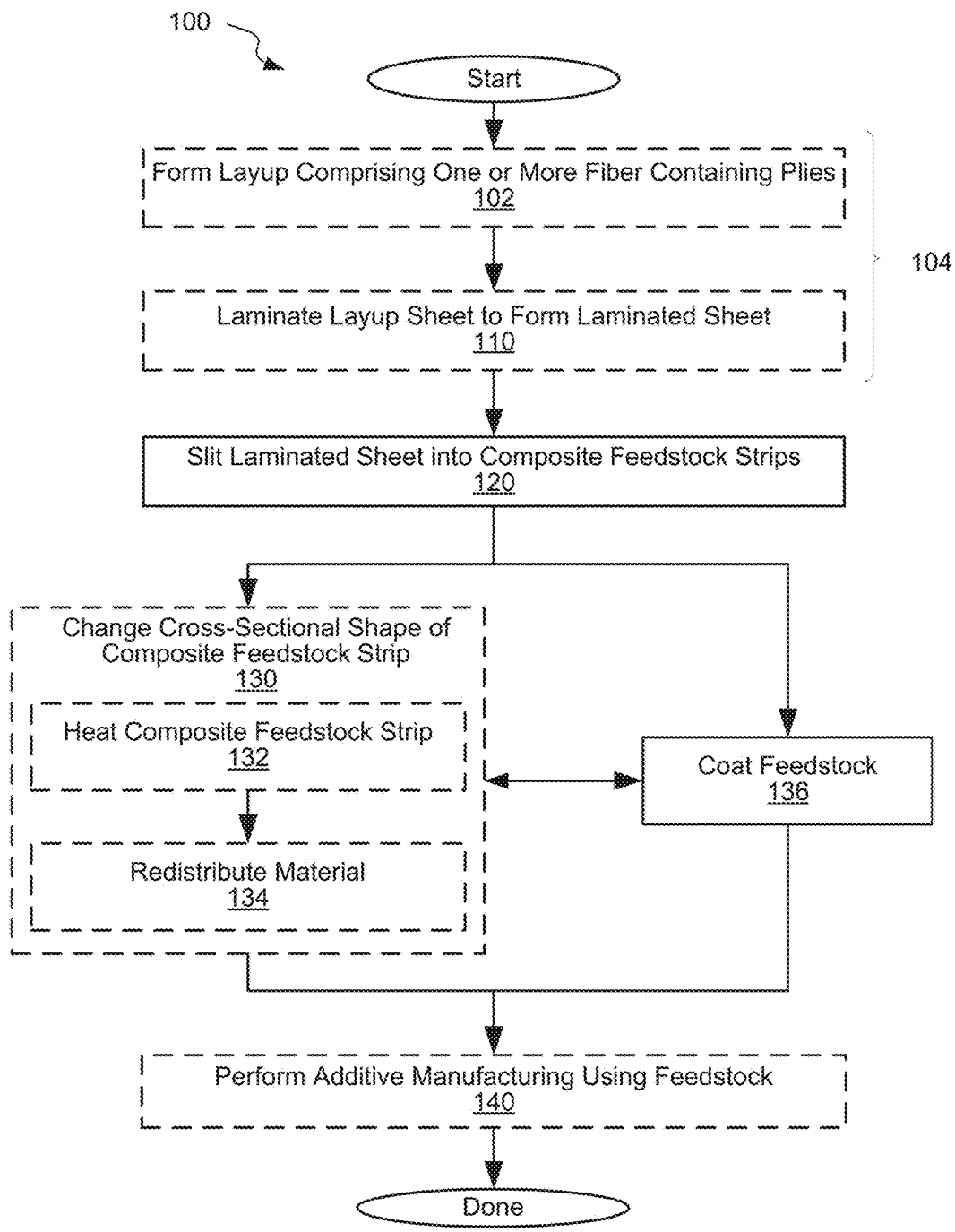
FIG. 1B is a process flowchart corresponding to another method of forming composite feedstock strips including coating layers, in accordance with some embodiments.

FIG. 1B is a process flowchart corresponding to another example of method 100. This example involves a coating operation performed on slit strips and, as such, composite feedstock strips formed using this method may be referred to as coated composite feedstock strips 520. Various examples of coated composite feedstock strips 520 are shown in FIGS. 5G-5K and further described below with references to these figures and the coating operation. Unless specifically noted, a composite feedstock strip identified with numeral 220 may be referred to as an uncoated composite feedstock strip to distinguish it from coated composite feedstock strip 520. Uncoated composite feedstock strips 220 are converted into coated composite feedstock strips 520 during the coating operation.

Returning to FIG. 1B, many operations of method 100 of forming coated composite feedstock strips 520 may be similar to corresponding operations of method 100 of forming uncoated feedstock strips 220, which is described above with reference FIG. 1A. Various references to the flowchart in FIG. 1A and the corresponding description above are made when appropriate.

The main difference between the flowcharts in FIGS. 1A and 1B is coating operation 136 of the later flowchart. Specifically, coating operation 136 may be performed after forming uncoated feedstock strips 220. By way of reminder, uncoated feedstock strips 220 may be formed by slitting a laminated sheet during operation 120.

In some embodiments, coating operation 136 eliminates the need to change the cross-sectional shape of the composite feedstock strip during operation 130 by redistributing at least some material on the surface of the strip. In these embodiments, operation 130 is not performed. Alternatively, when operation 130 is performed, coating operation 136 may be performed before or after operation 130. In other words, cross-sectional shape changing operation 130 may be performed either on uncoated composite feedstock strips 220 (followed by the coating) or on coated composite feedstock strips 520.

Another difference between flowcharts presented in FIGS. 1A and 1B or, more specifically, a difference between materials used in these two examples may be fiber distribution in uncoated composite feedstock strips 220. This fiber distribution corresponds to the one in a laminated sheet used to form composite feedstock strips 220. In the example of method 100 presented in FIG. 1B, the coating operation may be used for cross-sectional shape changing instead of rearranging portions of composite feedstock strips 220. Specifically, composite feedstock strips 220 may remain undisturbed while changing the cross-sectional shape, e.g., by adding the coating material onto the outer surface of composite feedstock strips 220. As such, the entire cross-section of composite feedstock strips 220 may include continuous fibers. No fiber-free portions are needed in composite feedstock strips 220 in this particular example since composite feedstock strips 220 remain undisturbed. The continuous fibers may be positioned near all surfaces of uncoated composite feedstock strips 220. The laminated sheet used to form uncoated feedstock strips 220 may be formed from fiber containing plies only and may not include external resin sheet.

Referring to FIG. 1B, method 100 may comprise forming laminated sheet 210 during optional operation 104. Operation 104 may involve forming layup 200 during operation 102 followed by laminating layup 200 during operation 110. Some examples of operations 102 and 110 are described above with reference to FIG. 1A. Examples of layup 200 and laminated sheet 210 are illustrated in FIGS. 2A-2D, 3A and 3D. Layup 200 may include one or more fiber containing plies 204 and, in some embodiments, resin plies 202. Resin plies 202 may be used as outer plies 208a and 208b as, for example, shown in FIG. 2A).

Figure 2C:
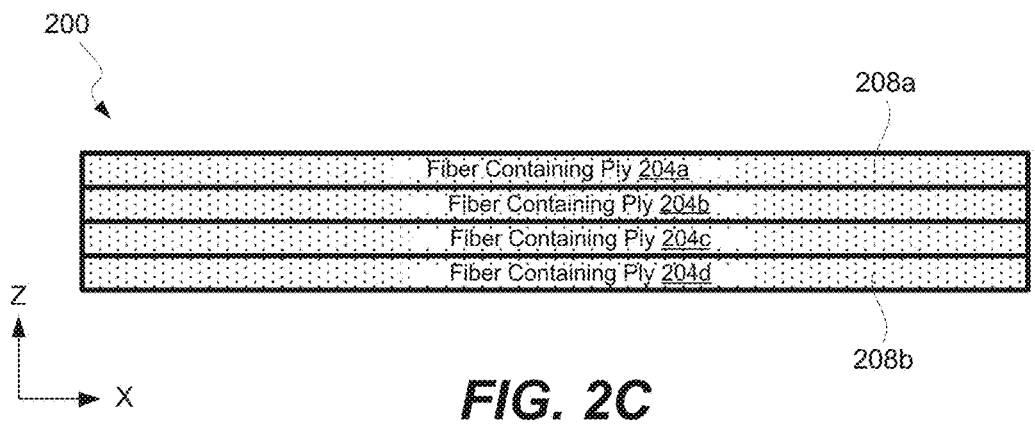
FIG. 2C is a schematic cross-sectional representation of a layup including only fiber containing plies, in accordance with some embodiments.

In some embodiments and unlike the example of method 100 described above with reference to FIG. 1A, layup 200 formed in accordance with method 100 of FIG. 1B may be formed from only fiber containing plies 204. FIG. 2C illustrates one examples of such layup 200 including fiber containing plies 204a-204d. It should be noted that both outer plies 208a-208b in this example are also fiber containing plies. In this example, the cross-sectional change of composite feedstock strips 202 may be achieved by coating these composite feedstock strips 202 rather than redistributing the material.

Figure 2D:
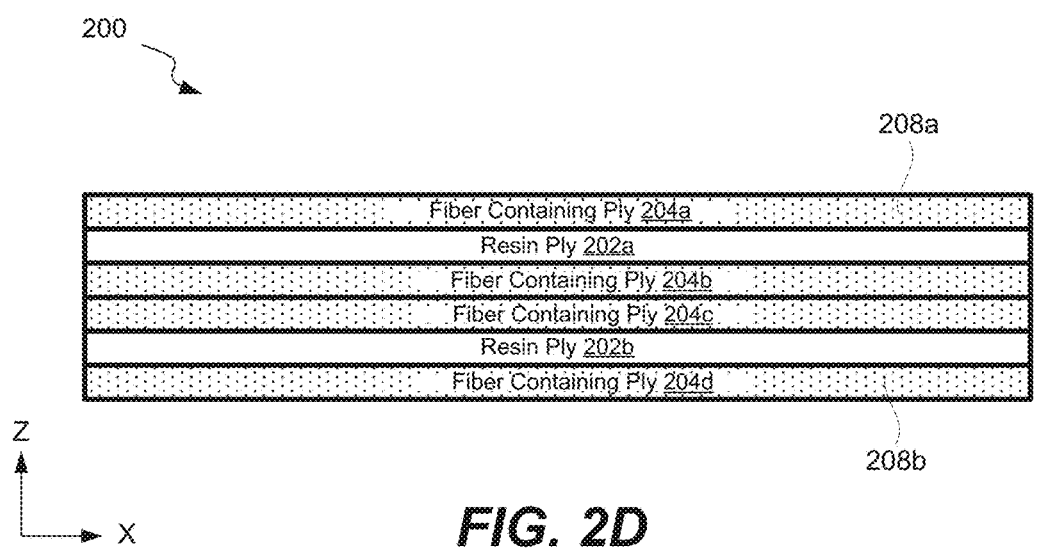
FIG. 2D is a schematic cross-sectional representation of a layup including resin plies and fiber containing plies such that outer plies of the layup are fiber containing layers, in accordance with some embodiments.

Alternatively, layup 200 may include one or more resin plies in addition to one or more fiber containing plies. However, outer plies 208a-208b may be fiber containing plies. FIG. 2D illustrates an example of such layup where resin plies 202a and 202b are positioned inside the stack while fiber containing ply 204a serves as one outer ply 208a and fiber containing ply 204d serves as another outer ply 208b.

As stated above, the coating operation may be used for cross-sectional shape changing. At least no material redistribution may be performed on uncoated composite feedstock strip 220 and no fiber-free material is needed on its surfaces. As such, outer plies 208a-208b of layup 200 may contain continuous fibers.

Figure 3C:
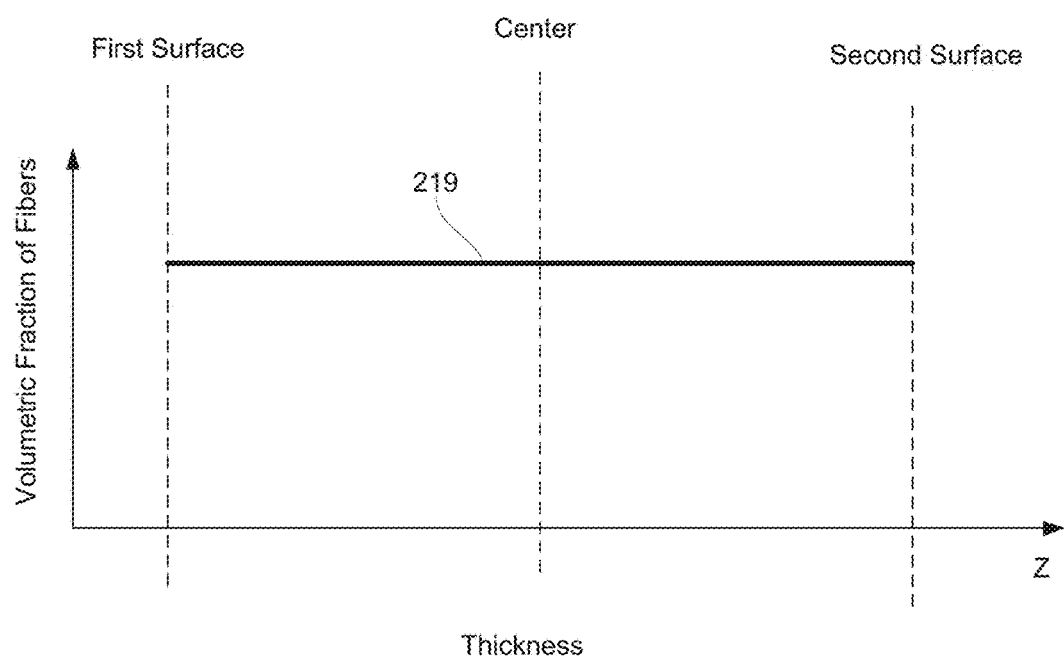
FIG. 3C is another plot showing a constant volumetric fraction of fibers within the laminated sheet, in accordance with some embodiments.

In these embodiments, the volumetric fraction of the continuous fibers within layup 200 and later in laminated sheet 210 may be constant throughout the thickness as, for example, shown in FIG. 3C. Specifically, FIG. 3C illustrates fiber volumetric fraction profile 219 throughout the thickness of laminated sheet 210 (or uncoated composite feedstock 200). However, as the coating layer is formed, this cross-sectional distribution changes as continuous fibers are generally not provided in this coating layer.

When one or more resin plies are used to form layup 200, these plies may be free from continuous fibers and, in some embodiments, free from other fillers. Because some plies have continuous fibers while other plies do not, the volumetric fraction of the continuous fibers within layup 200 and later with laminated sheet 210) varies throughout. One such example is described above with reference to FIG. 3B where the volumetric fraction of the continuous fibers may be greater at center portion 214 than at both surface portions 212 and 216. Comparing volumetric fraction profiles 219 in FIGS. 3B and 3C, one having ordinary skill in the art would understand that a higher loading of continuous fibers may be possible when the number of resin plies is reduced or even completely eliminated from layup 200.

Returning to FIG. 1B, method 100 of forming coated composite feedstock strips 520 may comprise slitting laminated sheet 210 into composite feedstock strips during operation 120. It should be noted that the composite feedstock strips formed during operation 120 are still uncoated. Various examples of slitting operation 120 are described above with reference to FIG. 1A and are also shown in FIGS. 3D and 4A.

Laminated sheet 210 and, as a result, slit feedstock strips 220 may comprise resin 207 and continuous fibers 206 extending parallel to each other along primary axis 223 of strip 220 (i.e., in the Y direction) as schematically shown FIGS. 4B and 4C. The slitting may be performed along the direction parallel to all continuous fibers 206 thereby preserving continuity of fibers 206.

In some embodiments, the concentration of continuous fibers 206 throughout the cross section of uncoated composite feedstock strips 220 is at least about 30% by volume or even at least about 40%, at least about 50%, or even at least about 60%. Such a high concentration of fibers 206 can provide excellent mechanical properties, such as a tensile strength in the direction of fibers 206. This concentration may be achieved by eliminating portions free from continuous fibers 206, such as surface portions 222 and 226 shown in FIG. 4B. As described above, fiber-free surface portions 222 and 226 are needed, when a coating is not used, to redistribute material in these portions without disturbing the fibers. Since fibers 206 are not added or removed during slitting operation 120, the fiber concentration of laminated sheet 210 and uncoated composite feedstock strips 220 may be the same. This concentration may be controlled during fabrication of laminated sheet 210 or, more particularly, while forming layup 200 during operation 102.

Figure 5D:
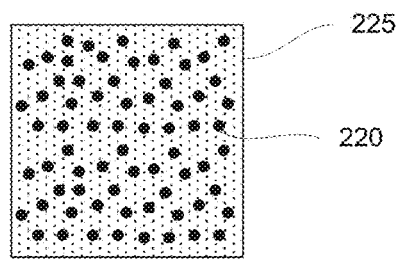
FIGS. 5D-5F are schematic cross-sectional representations of different examples of uncoated composite feedstock strips.
Figure 5E:
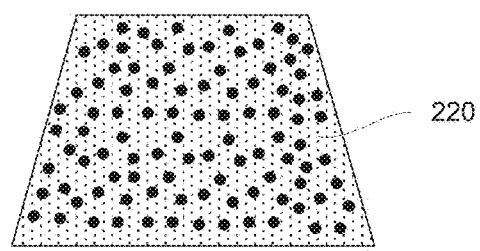

In some embodiments, the cross-sectional profile of uncoated composite feedstock strips 220 is selected from the group consisting of a rectangle, a square, a circle, and a trapezoid. Some of these examples are shown in FIGS. 5D-5F. The circular cross-sectional profile may be formed from an initially rectangular or square profile by redistributing material before coating as further described below with reference to FIGS. 5L and 5M. The trapezoidal cross-sectional profile may be formed, for example, when a wedged shape slitting tool pushes some of the material in the direction of the slit. It should be noted that forming a circular profile from starting with the trapezoidal cross-section by redistributing material on the top and bottom surfaces may be challenging. Forming a coating layer may help to overcome these challenges.

Figure 7B:
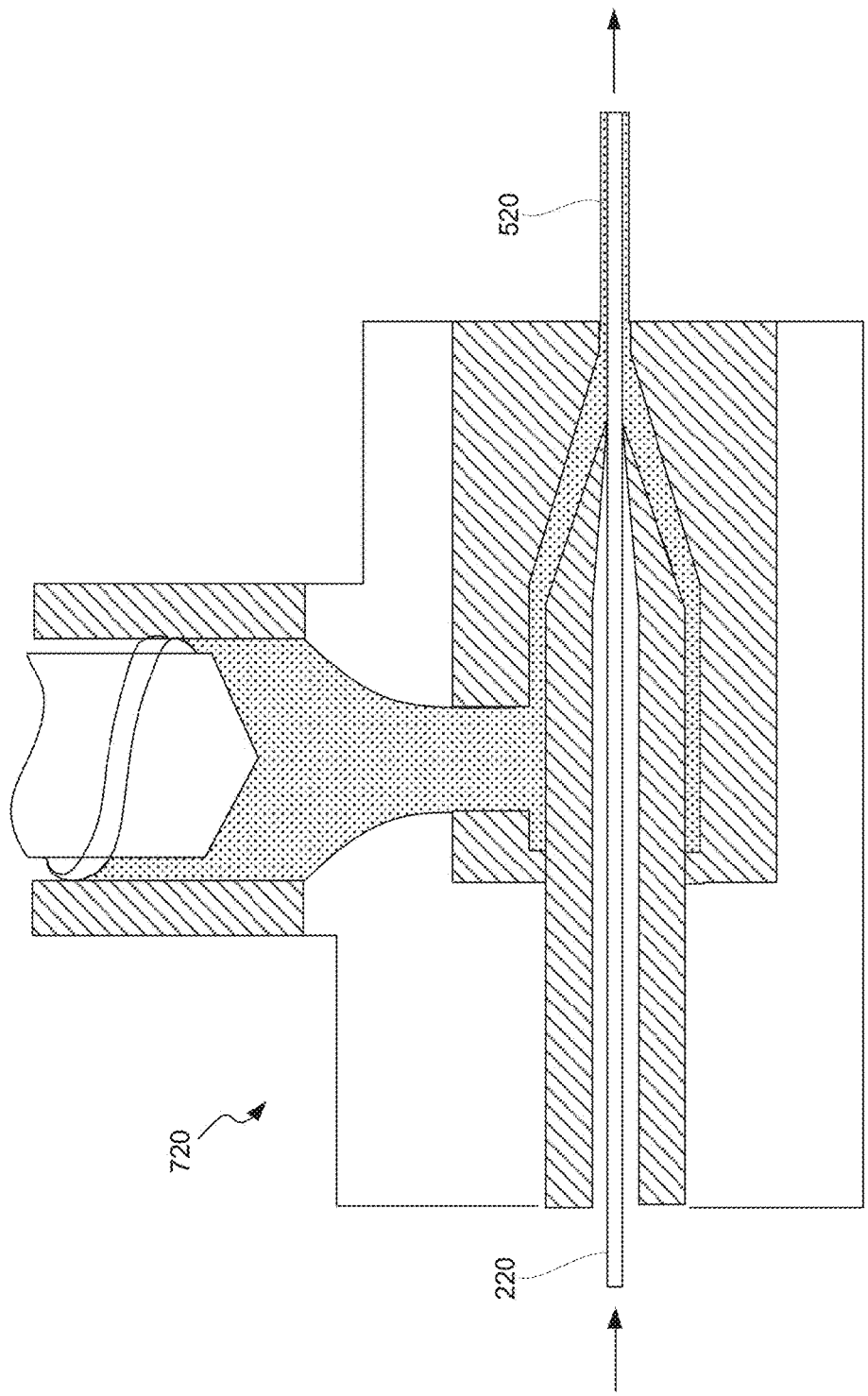
FIG. 7B is a schematic representation of an apparatus used for forming a coated composite feedstock strip, in accordance with some embodiments.

Returning to FIG. 1B, method 100 may proceed with coating outer surface 225 of composite feedstock strips 220 during operation 136. The coating operation may involve a cross-head extrusion coating technique, powder coating, and solution-based coating technique. FIG. 7B illustrates an example of apparatus 720 for coating composite feedstock strips 220 and forming coated composite feedstock strips 520.

Figure 5G:
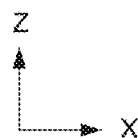
FIGS. 5G-5K are schematic cross-sectional representations of different examples of coated composite feedstock strips.
Figure 5G:
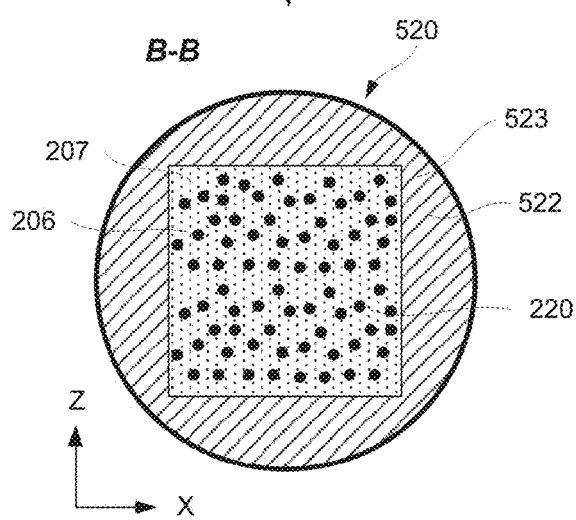
Figure 5F:
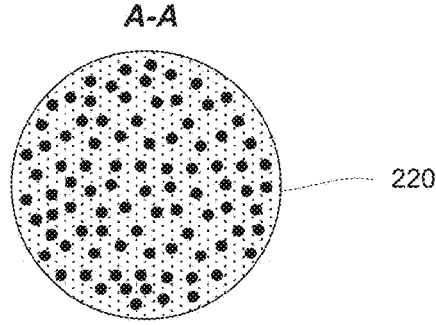
Figure 5H:
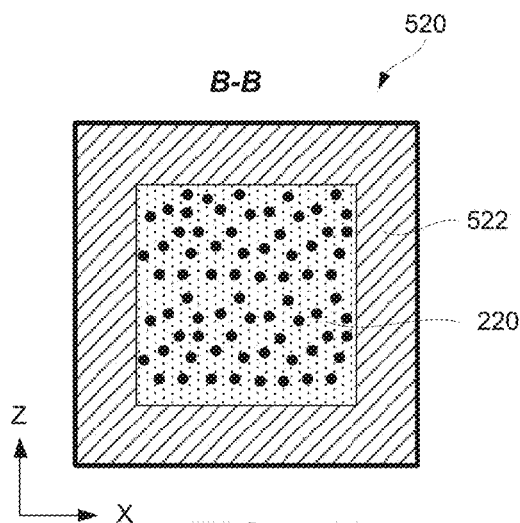

During operation 136, coating layer 522 is formed on outer surface 225 as schematically shown in FIGS. 5D and 5G. Coating layer 522 may include a resin. This resin may be the same as or different from the resin of uncoated composite feedstock strips 220, which may be a part of plies forming layup 200. For clarity, the resin of uncoated composite feedstock strips 220 may be referred to as first resin 207, while the resin of coating layer 522 may be referred to as second resin 523 (refer to FIG. 5G, for example). In some embodiments, one of first resin 207 and second resin 522 comprises one or more materials selected from the group consisting of polyethersulfone (PES), polyphenyl sulfide (PPS), polyetheretherketone (PEEK), polyetherketoneketone (PEKK), polyetherimide (PEI), and thermoplastic polyimide (TPI). For example, first resin 207 and second resin 523 may be both polyetherketoneketone (PEKK).

In some embodiments, the material used for coating layer 522 comprises a filler in addition to second resin 523. The filler may be selected from the group consisting of fibers, particles, and flakes. For example, the filler may comprise discontinuous fibers, which are different from the continuous fibers of the sheet and later of the composite feedstock strips at least based on their aspect ratio. The filler may be selected from the group consisting of a heat sensitive additive, a mineral reinforcement, a thermal stabilizer, an ultraviolet (UV) stabilizer, a lubricant, a flame retardant, a conductive additive, a pigment, and various combinations thereof. In one example, the filler is a heat sensitive additive. In the same of another example, the filler is a mineral reinforcement. In the same of another example, the filler is a thermal stabilizer. In the same of another example, the filler is an ultraviolet (UV) stabilizer. In the same of another example, the tiller is a lubricant. In the same of another example, the filler is a flame retardant. In the same of another example, the filler is a conductive additive. In the same of another example, the filler is a pigment.

In some embodiments, the thickness of coating layer 522 is uniform. This type of coating layer may be also referred to as a conformal coating. For example, the thickness variation may be less than 20% or even less than 10%. In these embodiments, the cross section of coated composite feedstock strip 520 may represent a scaled up variation of the cross section of composite feedstock strips 220 prior to its coating as, for example, schematically shown in FIGS. 5H and 5K.

In some embodiments, the cross section of composite feedstock strips 220 or, more specifically, the cross-sectional profile of composite feedstock strips 220 remains the same during coating operation 136. This shape retention is schematically shown in FIGS. 5D and 5G. In these embodiments, the coating process does not disturb composite feedstock strips 220.

Despite the cross-sectional profile of composite feedstock strips 220 remaining the same during coating operation 136, the cross-sectional profile of coated composite feedstock strips 520 may be different than that of uncoated composite feedstock strips 220. For example, uncoated composite feedstock strip 220 may have a rectangle, square, or trapezoid profile as described above. Coated composite feedstock strip 520 formed from this uncoated composite feedstock strip 220 may have a circular profile or an oval profile as, for example, schematically shown in FIGS. 5D and 5G.

Various examples of coated composite feedstock strip 520 are shown in FIGS. 5G-5K. In some embodiments, the cross-sectional profile of coated composite feedstock strips 520 may be the same as of uncoated composite feedstock strips 220, see, e.g., FIG. 5M or 5K. One having ordinary skill in the art would understand that the principal dimension of the cross-sectional profile will still increase in these examples. In general, the cross-sectional profile of coated composite feedstock strip 520 is selected from the group consisting of an oval, a circle, a rectangle, a square, and a rounded corner rectangle, and a rounded corner square.

In some embodiments, prior to coating operation 136, method 100 may involve changing the cross-sectional profile of uncoated composite feedstock strip 220 during operation 130. This example is schematically shown in FIGS. 5L-5N. Specifically, FIG. 5L illustrates uncoated composite feedstock strip 220 having a square cross-sectional shape. This shape may be a result of slitting operation 120, for example. During operation 130 this square cross-sectional shape is changed by redistributing material of uncoated composite feedstock strip 220. This operation is described in more detail with reference to FIG. 1A. FIG. 5M illustrates still uncoated composite feedstock strip 220 having a circular cross-sectional shape after this operation. Subsequently, this circular composite feedstock strip 220 may be coated thereby forming coated composite feedstock strip 520 as, schematically, shown in FIG. 5N.

In some embodiments, method 100 may involve changing the cross-sectional profile of coated composite feedstock strip 520. In other words, shape changing operation 130 is performed after coating operation 136. This example is schematically shown in FIGS. 5O-5Q. Specifically, FIG. 5O illustrates uncoated composite feedstock strip 220 having a square cross-sectional shape. This square composite feedstock strip 220 may be coated thereby forming coated composite feedstock strip 520 as, schematically, shown in FIG. 5P. During operation 130 this square cross-sectional shape is changed by redistributing material of coating layer 522 of coated composite feedstock strip 220. Without being restricted to any particular theory, it is believed that the approach shown in FIGS. 5O-5Q may be less impactful to continuous unidirectional fibers 206 than the approach shown in FIGS. 5L-5N.

Figure 8B:
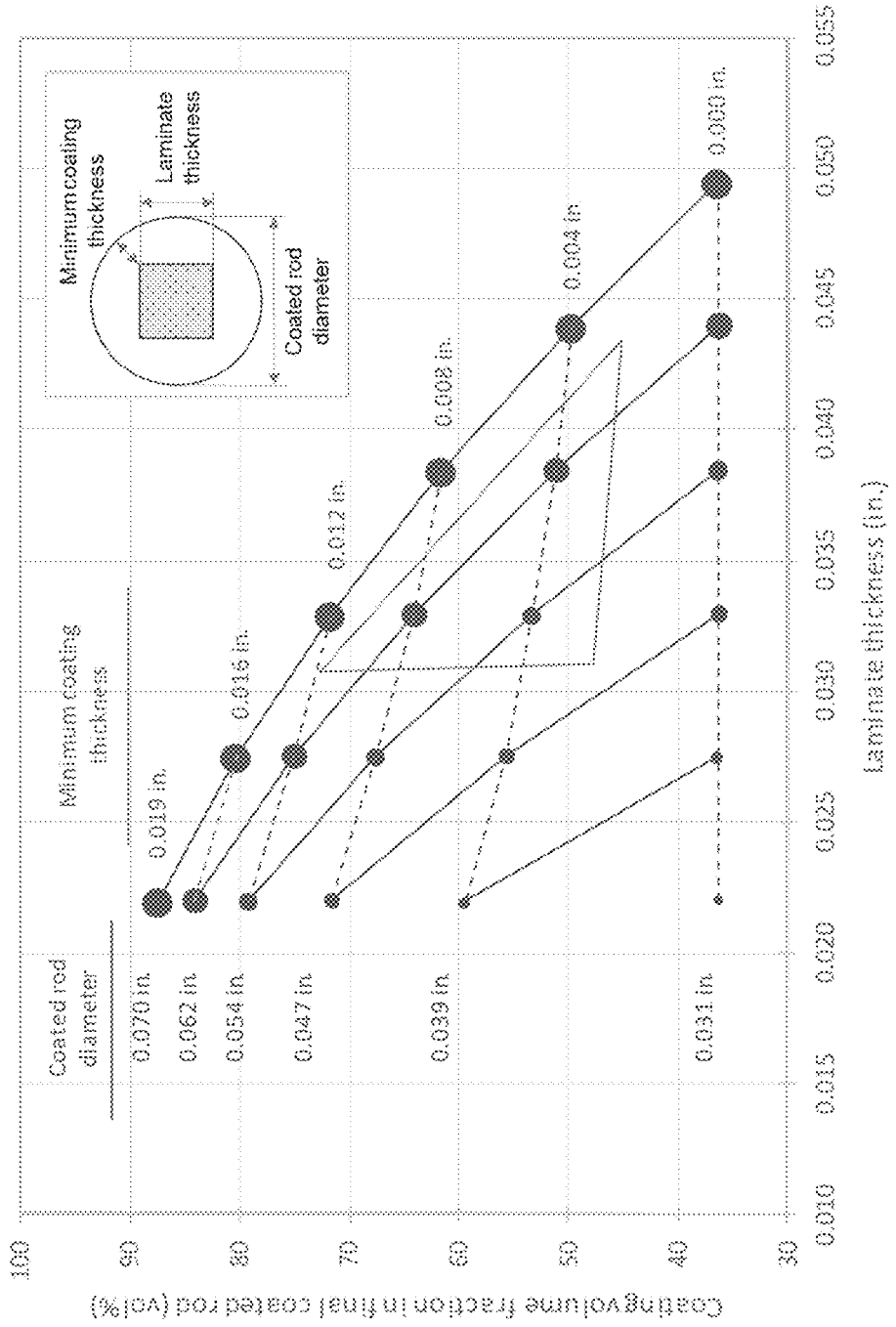
FIG. 8B is a plot of a coating volume fraction in a coated feedstock with a circular coating on a square laminate core as a function of the laminate thickness and coating thickness.

Characteristics of various embodiments of coated composite feedstock strips for use in additive manufacturing were explored using an illustrative analysis. In this analysis, a coating of neat resin (free of fibers) or a coating of resin containing 30 wt % discontinuous fibers is applied to a square laminate core made up of fiber-containing plies. This core has a constant volumetric fraction of continuous fibers of about 60% throughout its thickness. FIG. 8B is a plot of coating volume fraction for a circular coating as a function of the laminate thickness and the thickness of the coating. For a square laminate core, the laminate width is equal to the laminate thickness, and the laminate thickness increases discretely based on the number of fiber-containing plies used in the layup. The laminate thicknesses described in FIG. 8B correspond to 4-9 fiber-containing plies. The relative size of data points corresponds to the final coated rod diameter, with solid lines connecting embodiments with the same diameter equal to that given to the left of the series. The coating thickness is given by the minimum coating thickness measured radially from the corner of the laminate core as shown in the inset figure. Dotted lines connect embodiments with the same minimum coating thickness equal to that listed to the right of the series. To narrow the range of possibilities to those of technical significance for practical manufacture and use, the following constraints were placed on these embodiments and those to follow with other coating cross sectional shapes: (1) the laminate thickness is greater than 0.030 in. for practical slitting operations; (2) the minimum coating thickness at any location in the cross section is 0.004 in. or larger to allow for manufacturing tolerance in the coating operation; (3) the largest dimension in the cross section should be less than 0.070 in. to allow the feedstock to enter a liquifier with an inlet diameter of 0.070 in.; and (4) to ensure that no continuous fiber interference occurs with the wall of the liquefier, a minimum of 0.001 in. of coating material is maintained between the continuous fiber-containing laminate core and the wall of the liquefier after any shape conversion. With these constraints, the solution space for satisfactory embodiments is denoted by the triangular region highlighted in FIG. 8B. Relatively large volume fractions of coating are required, from 51-65%. This translates to 20-28% fiber content by volume in the final coated rod for a neat resin coating and 36-40% for a coating with 30 wt % discontinuous fibers.

Figure 8C:
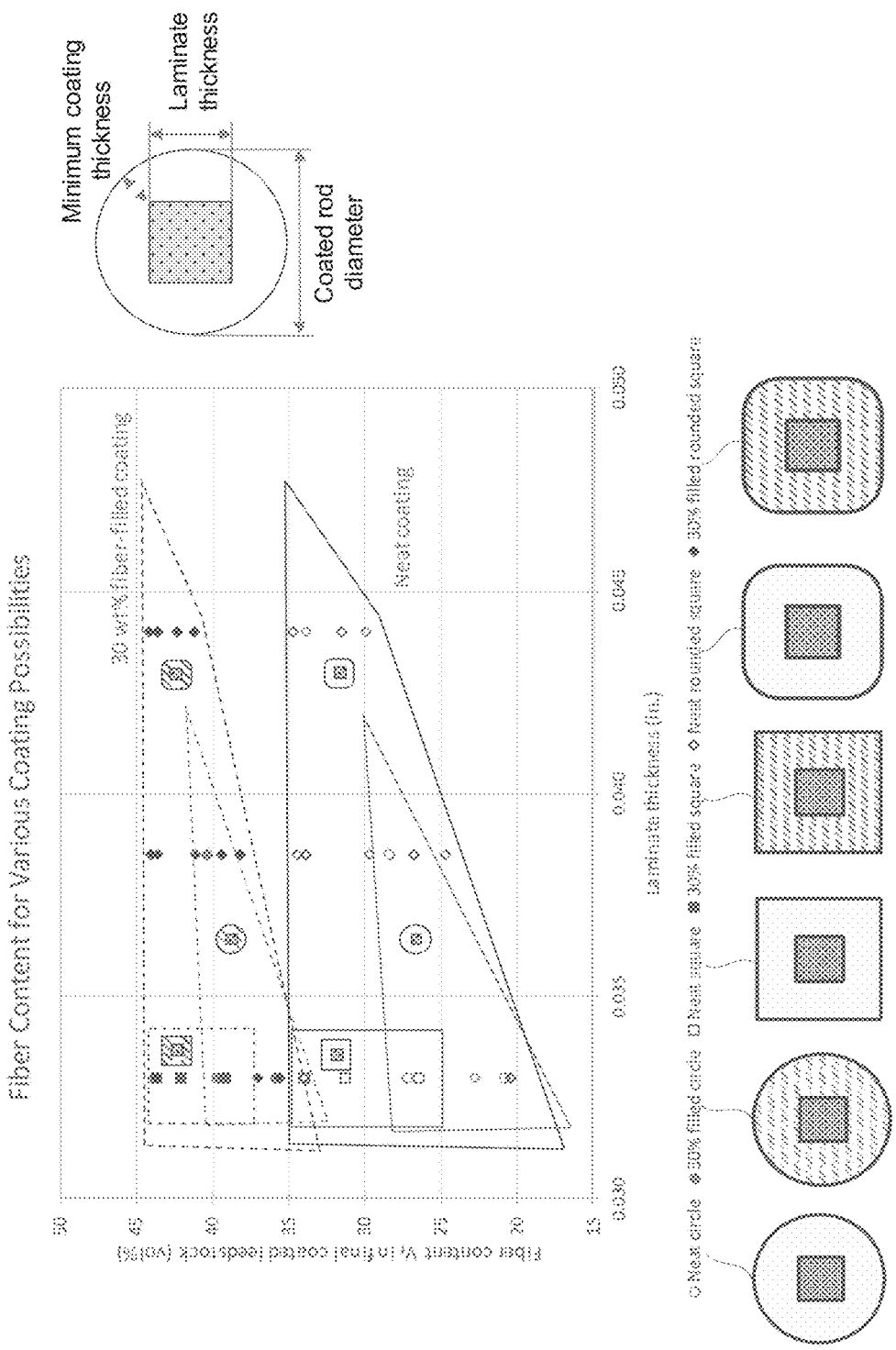
FIG. 8C is a plot of the fiber content in a coated feedstock as a function of the laminate thickness, coating thickness, and coating cross sectional shape.

The fiber content in the final coated feedstock is plotted in FIG. 8C as a function of the laminate thickness, final coated feedstock cross-sectional shape, and coating material. The solution spaces highlighted satisfy the four constraints listed previously for square laminate cores with coatings of the following shapes: circular, square, and rounded corner square. The solution spaces corresponding to coatings with neat resin and with 30 wt % discontinuous fibers are given by the regions with solid borders and those with dotted borders, respectively. Circular coatings do not require shape conversion in the liquefier during additive manufacturing, whereas square and rounded square coatings require shape conversion to circular in the liquefier or prior to the liquefier. The cross-sectional area of the exit of the liquefier is equal to the cross-sectional area of the incoming coated feedstock to ensure steady and stable flow through the liquefier is maintained.

The solution spaces for circular coated feedstocks in FIG. 8C correspond to the triangular region highlighted in FIG. 8B. The maximum laminate core thickness is limited to ensure the final coated feedstock can be fed reliably into the 0.070 in. liquefier entrance, and the fiber content achievable is limited by the amount of coating needed to ensure the minimum coating thickness is at least 0.004 in. for practicality of the coating operation.

The volume fraction of coating could conceivably be decreased and therefore the overall fiber content increased by coating with a square coating and allowing the shape to change in the liquefier as depicted in FIG. 5O-5Q. The square coating solution space is limited to small laminate thicknesses to allow the feedstock to enter the 0.070 in. liquefier entrance. The range of fiber content for the coated feedstock results from varying the coating thickness, as measured from the side of the laminate core, with higher fiber content resulting from thinner coating thicknesses. A minimum of 0.005 in. coating thickness is required to ensure that the overall coating volume fraction is large enough that at least 0.001 in. coating material is maintained between the corners of the laminate core and the wall of the liquefier after the shape conversion to circle. This coating thickness yields the maximum fiber content of 34% for a neat resin coating and 44% for a 30 wt % discontinuous fiber-filled coating.

Figure 5I:
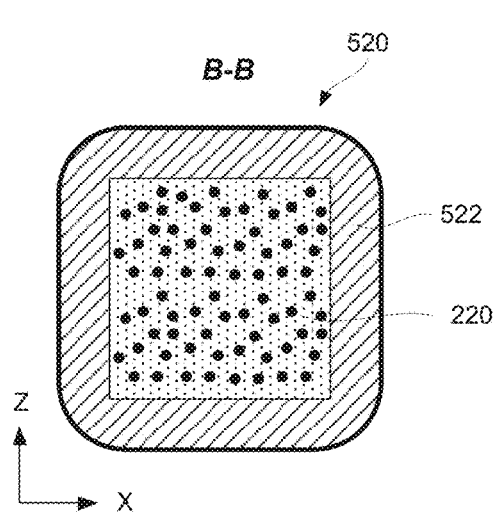
Figure 5J:
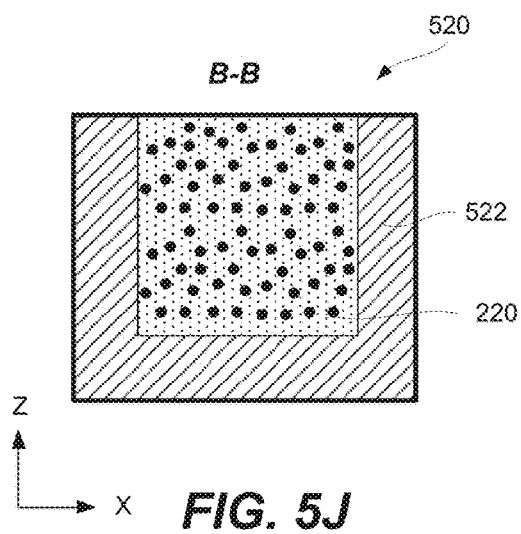
Figure 5K:
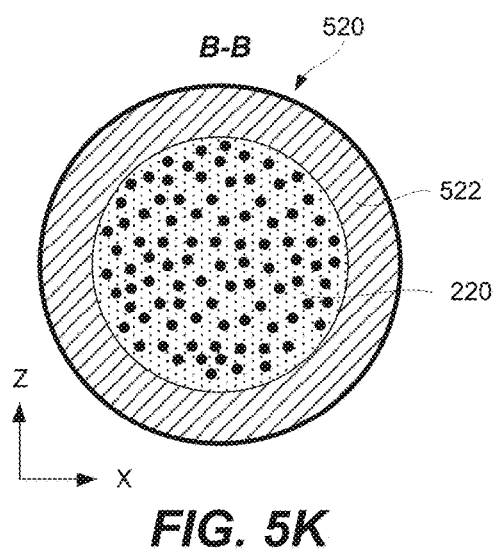
Figure 5L:
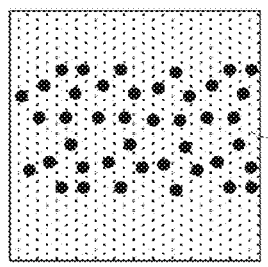
FIGS. 5L-5N are schematic cross-sectional representations of a composite feedstock strip at different fabrication stages when the composite feedstock strip changes its cross-sectional profile prior to coating.
Figure 5M:
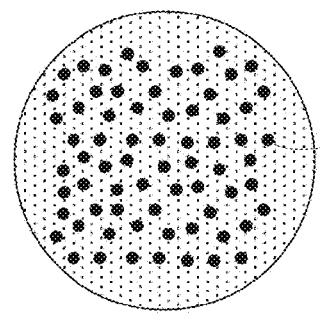
Figure 5N:
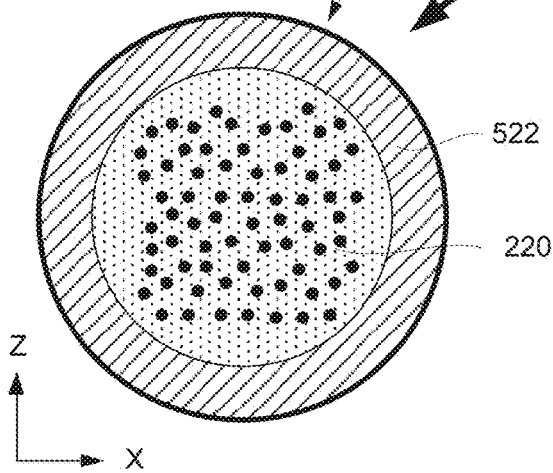
Figure 5O:
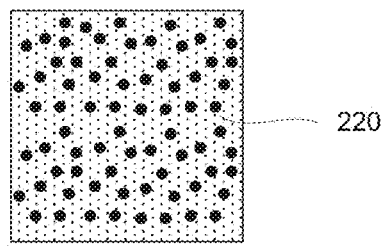
FIGS. 5O-5Q are schematic cross-sectional representations of a composite feedstock strip at different fabrication stages when the composite feedstock strip changes its cross-sectional profile after coating.
Figure 5P:
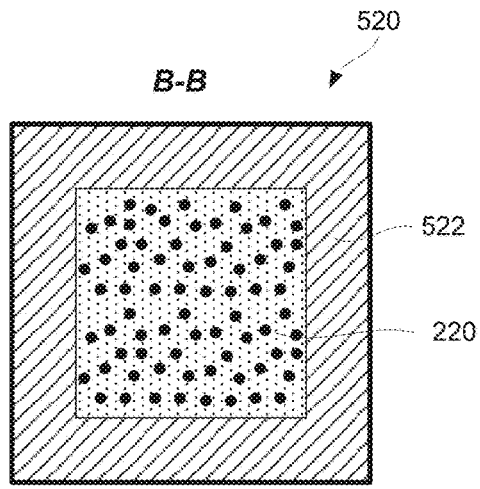
Figure 5Q:
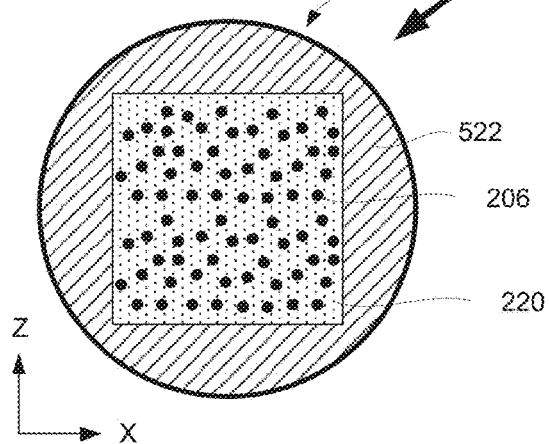

The solution space may be expanded to larger laminate thicknesses while still maximizing the overall fiber content by using a rounded corner square coating, as that depicted in FIG. 5I. Larger laminate core thicknesses are able to be used because the largest dimension in the cross section, the diagonal distance from opposite corners, is reduced. Cases where the largest dimension is 0.070 in. are also accepted because less contact area with the liquefier walls at the entrance allows for more reliable feed compared to circular coatings which have full contact with the walls. For a given laminate thickness, the fiber content in the coated feedstock may be increased by using thinner coatings, as measured from the side of the laminate, with corners rounded such that the diagonal distance is 0.070 in. The maximum achievable fiber content is also plotted for each laminate thickness where the coating thickness at the rounded corner, measured radially from the corner of the laminate, is held at the minimum acceptable value of 0.004 in. for practical coating operation. With these maximum rounded corners, the coating thickness measured from the side of the laminate should be 0.005 in., 0.006 in., and 0.007 in. for laminate thicknesses of 0.033 in., 0.039 in., and 0.044 in., respectively, yielding fiber contents of 34-35% by volume using a neat resin coating and 44% by volume using a coating with 30 wt % discontinuous fibers.

Examples of Aircraft and Methods of Fabricating and Operation Aircraft

The illustrated embodiments provide a novel fabrication method of forming composite feedstock strips with continuous unidirectional orientations of continuous fibers and tailored distribution of these continuous fibers throughout the cross-section of the strips. Furthermore, these methods provide for different cross-sectional profiles and/or dimensions of the strips. Continuous processing used in these methods not only increases processing throughput but also provides high level of control of various characteristics of the composite feedstock strips. The embodiments find applicable uses in a wide variety of potential applications, including for example, in the aerospace industry. The disclosed method is ideally suited for additive manufacturing of parts having complex geometries, such as brackets, clip supports, link levers, or more generally any irregular cross sections-structures, which are currently formed from metal (e.g., lugs, end fittings). The parts should be generally distinguished from parts having simple (e.g., linear) geometries such as beams (such as non-varying cross sections). The disclosed method is also suited for one-of-a-kind, customized, or very limited part runs with non-varying cross section, which could be fabricated using additive manufacturing.

Figure 9:
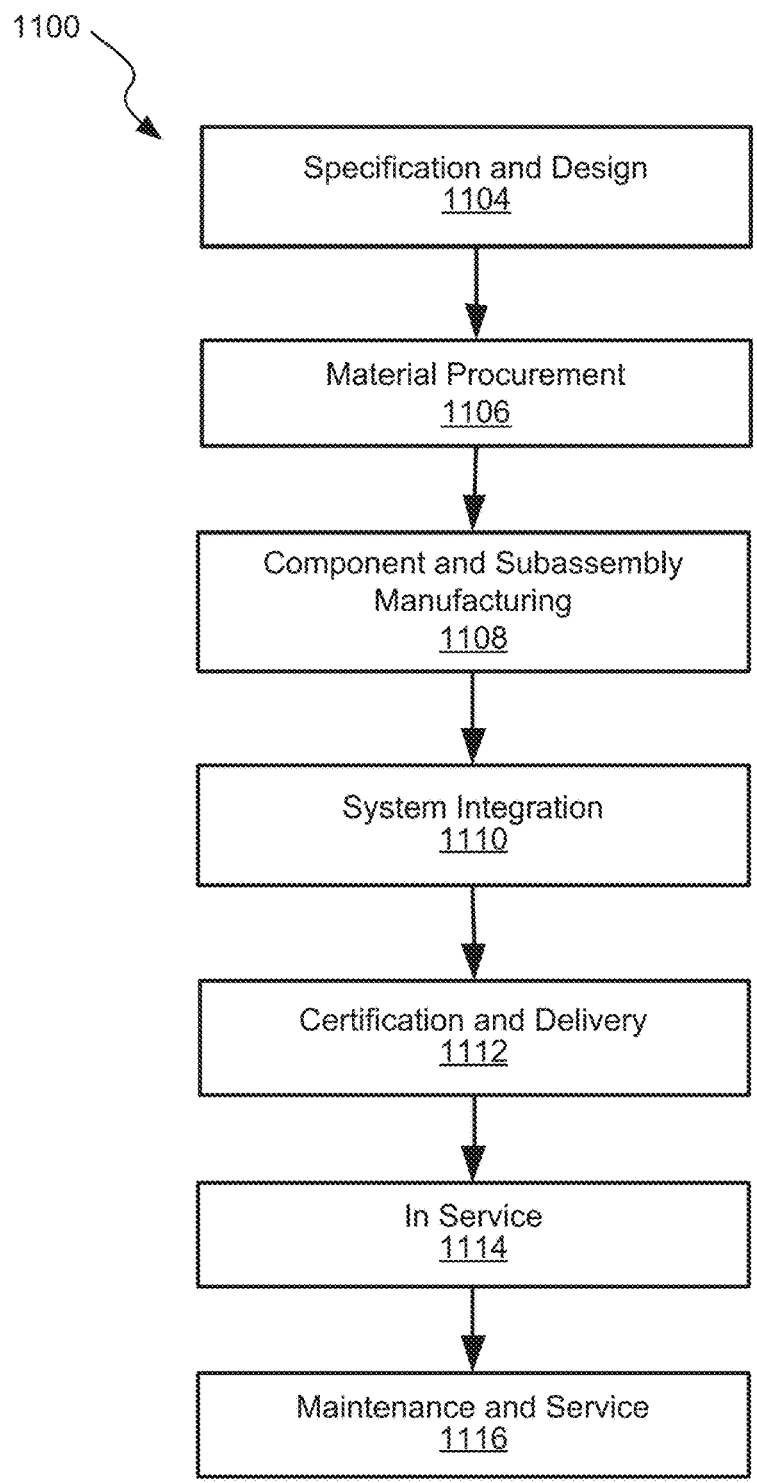
FIG. 9 is a block diagram of aircraft production and service methodology that may utilize end effectors described herein.
Figure 10:
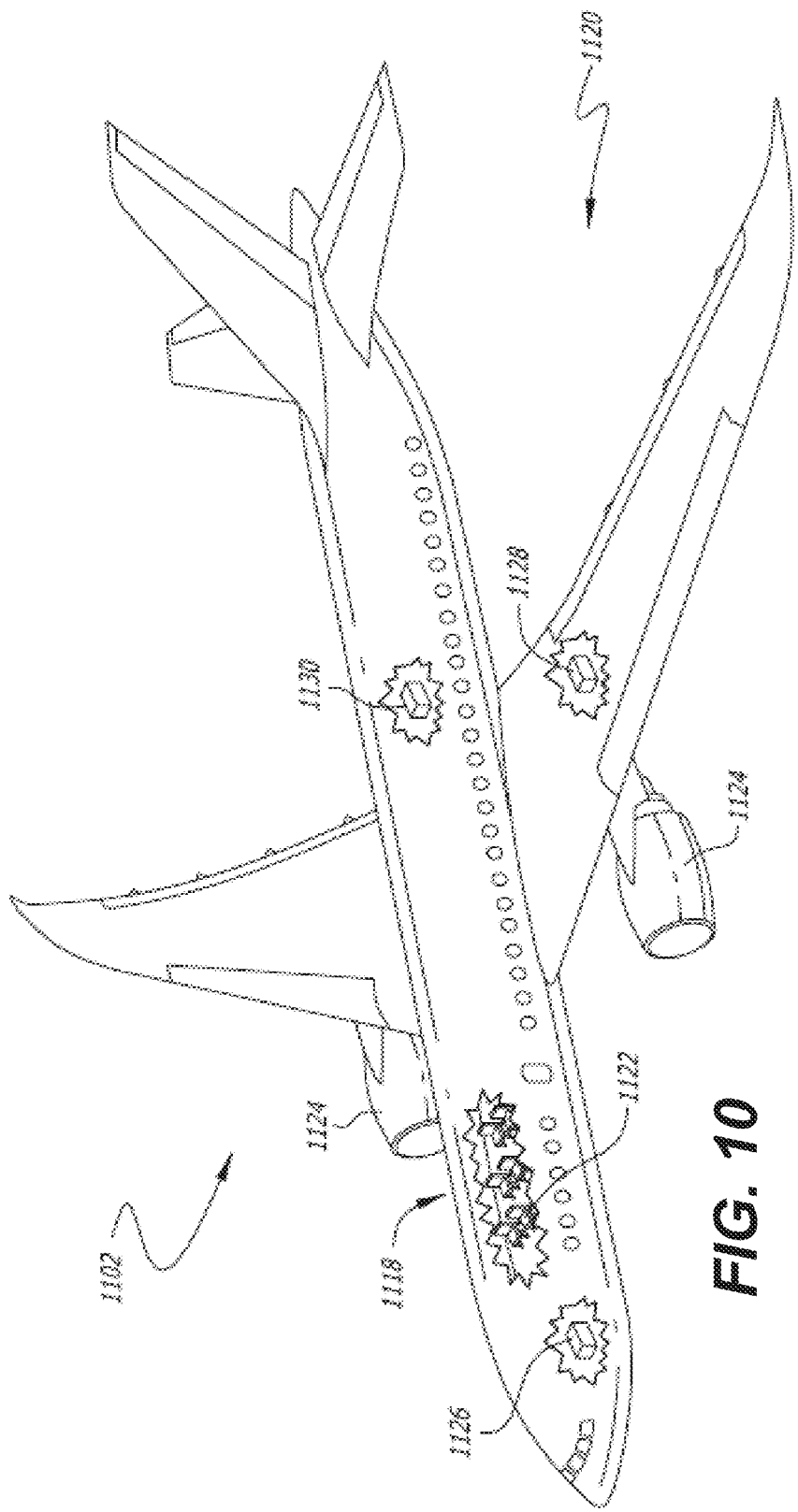
FIG. 10 is a schematic illustration of an aircraft that may include composite structures described herein.

Examples of the present disclosure may be described in the context of aircraft manufacturing and service method 1100 as shown in FIG. 9 and aircraft 1102 as shown in FIG. 10. During pre-production, method 1100 may include specification and design (block 1104) of aircraft 1102 and material procurement (block 1106). During production, component and subassembly manufacturing (block 1108) and system integration (block 1110) of aircraft 1102 may take place. Composite feedstock strips may be formed and used in additive manufacturing during one of these steps, e.g., specification and design (block 1104) of aircraft 1102, material procurement (block 1106), component and subassembly manufacturing (block 1108), and system integration (block 1110) of aircraft 1102. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of forming coated composite feedstock strips for additive manufacturing, the method comprising:
   varying a volumetric fraction of fibers within a sheet throughout a thickness of the sheet,
   the sheet comprises a first resin and the fibers extending parallel to each other within the sheet,
   the thickness being perpendicular to the fibers;
   slitting the sheet into composite feedstock strips,
   slitting being performed along a direction parallel to all of the fibers within the sheet; and
   coating an outer surface of the composite feedstock strips with a material comprising a second resin thereby forming the coated composite feedstock strips comprising a coating layer disposed over the composite feedstock strips.

2. The method of claim 1, wherein the fibers extending parallel to each other within the sheet are continuous fibers.

3. The method of claim 1, wherein a distribution of the fibers throughout a cross section of the composite feedstock strips is uniform.

4. The method of claim 1, wherein a concentration of the fibers throughout a cross section of the composite feedstock strips is at least about 40% by volume.

5. The method of claim 1, wherein a cross section of the composite feedstock strips remains same while coating the outer surface of the composite feedstock strips with the material.

6. The method of claim 1, wherein a thickness of the coating layer on the outer surface of the composite feedstock strips is uniform.

7. The method of claim 1, wherein the material used for coating layer further comprises a filler selected from the group consisting of fibers, particles, and flakes.

8. The method of claim 7, wherein the filler comprises discontinuous fibers.

9. The method of claim 7, wherein the filler is selected from the group consisting of a heat sensitive additive, a mineral reinforcement, a thermal stabilizer, an ultraviolet (UV) stabilizer, a lubricant, a flame retardant, a conductive additive, and a pigment.

10. The method of claim 1, wherein coating is performed using one of a cross-head extrusion coating technique, powder coating, or a solution-based coating technique.

11. The method of claim 1, wherein a cross-sectional profile of the composite feedstock strips is selected from the group consisting of a rectangle, a square, and a trapezoid, and wherein a cross-sectional profile of the coated composite feedstock strips is selected from the group consisting of an oval, a circle, a rectangle, a square, and a rounded corner rectangle, and a rounded corner square.

12. The method of claim 1, wherein one of the first resin and the second resin comprises one or more materials selected from the group consisting of polyethersulfone (PES), polyphenylenesulfide (PPS), polyetheretherketone (PEEK), polyetherketoneketone (PEKK), polyetherimide (PEI), and thermoplastic polyimide (TPI).

13. The method of claim 1, wherein the first resin and the second resin are same.

14. The method of claim 13, wherein the first resin and the second resin are both polyetherketoneketone (PEKK).

15. The method of claim 1, further comprising, prior to slitting the sheet, forming a layup comprising fiber containing plies and laminating the layup thereby forming the sheet.

16. The method of claim 15, wherein all sheets of the layup are the fiber containing plies.

17. The method of claim 1, further comprising, prior to slitting the sheet, forming a layup comprising one or more fiber containing plies and one or more of resin plies and laminating the layup thereby forming the sheet.

18. The method of claim 1, wherein the volumetric fraction of the fibers within the sheet is greater at a center of the sheet along the thickness of the sheet than at one of surfaces of the sheet.

19. A coated composite feedstock strip, the coated composite feedstock strip comprising:
   a composite feedstock strip comprising a first resin and fibers extending parallel to each other within the composite feedstock strip,
   a volumetric fraction of the fibers within the composite feedstock strip varying throughout a thickness of the composite feedstock strip, the thickness being perpendicular to the fibers; and
   a coating layer comprising a second resin and disposed on an outer surface of the composite feedstock strip and forming a shell around composite feedstock strip,
   the coating layer comprising a second resin.

20. The method of claim 1, further comprising performing additive manufacturing using the coated composite feedstock strips.

* * * * *